United States Patent
Sano et al.

(10) Patent No.: US 8,539,178 B2
(45) Date of Patent: Sep. 17, 2013

(54) COMPUTER SYSTEM AND METHOD FOR PERFORMING REMOTE COPY USING JOURNAL

(75) Inventors: Kazuhide Sano, Fujinomiya (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 687 days.

(21) Appl. No.: 12/329,907

(22) Filed: Dec. 8, 2008

(65) Prior Publication Data

US 2010/0106924 A1    Apr. 29, 2010

(30) Foreign Application Priority Data

Oct. 23, 2008  (JP) .................................. 2008-272590

(51) Int. Cl.
G06F 12/16  (2006.01)
G06F 13/00  (2006.01)

(52) U.S. Cl.
USPC .......................................................... 711/162

(58) Field of Classification Search
USPC .......................................................... 711/162
See application file for complete search history.

(56) References Cited

U.S. PATENT DOCUMENTS

| | | | |
|---|---|---|---|
| 5,734,818 A | 3/1998 | Kern et al. | 714/20 |
| 8,078,581 B2* | 12/2011 | Amaki et al. | 707/648 |
| 2005/0198452 A1* | 9/2005 | Watanabe | 711/162 |
| 2006/0023527 A1 | 2/2006 | Arakawa et al. | 365/202 |
| 2007/0050547 A1* | 3/2007 | Sano et al. | 711/114 |
| 2007/0050574 A1* | 3/2007 | Kaiya et al. | 711/162 |
| 2007/0233981 A1* | 10/2007 | Arakawa et al. | 711/162 |

FOREIGN PATENT DOCUMENTS

| | | |
|---|---|---|
| CN | 101046759 | 10/2007 |
| EP | 0672985 B1 | 5/1998 |
| EP | 1840747 | 10/2007 |
| EP | 1845448 | 10/2007 |
| JP | 2006039976 | 2/2006 |

OTHER PUBLICATIONS

English Translation of Chinese Office Action Application No. 200910203115X.

* cited by examiner

*Primary Examiner* — Sanjiv Shah
*Assistant Examiner* — Glenn Gossage
(74) *Attorney, Agent, or Firm* — Brundidge & Stanger, P.C.

(57) ABSTRACT

A computer system for performing a remote copy using a journal so as to maintain conformability of data stored in a secondary storage system even though a time stamp is not granted to write data received by a primary storage system. A storage managing unit issues an ID, such as a time stamp number (TS#) next to an immediately previously issued ID to one or more primary storage systems (PDKCs) at regular or irregular intervals. Upon receiving a write command, each PDKC prepares a journal (JNL) including a replica of write data and the newest ID from the storage managing unit, and transmits the journal to a secondary storage system (SDKC). The SDKC stores a received JNL and reflects up to a particular JNL of non-reflected JNLs in a secondary volume. The particular JNL has an ID older by one than the oldest ID of the newest arrival completion IDs in one or more SDKCs.

6 Claims, 28 Drawing Sheets

| VOL. NO | VOL ATTRIBUTE | JNL GROUP NO | PAIR STATE | COUNTERPART VOL. NO | COUNTERPART JNL GROUP NO |
|---|---|---|---|---|---|
| 0000 | POSITIVE | 1 | PAIR | 1000 | 2 |
| 0001 | POSITIVE | 1 | Suspend | 1001 | 2 |
| 0002 | UNUSED (0) | – | – | – | – |
| 0003 | POSITIVE | 1 | Copy | 1003 | 2 |

| VOL. NO | VOL ATTRIBUTE | JNL GROUP NO | PAIR STATE | COUNTERPART VOL. NO | COUNTERPART JNL GROUP NO |
|---|---|---|---|---|---|
| 1000 | NEGATIVE | 2 | PAIR | 0000 | 1 |
| 1001 | NEGATIVE | 2 | Suspend | 0001 | 1 |
| 1002 | UNUSED (0) | – | – | – | – |
| 1003 | NEGATIVE | 2 | Copy | 0003 | 1 |

FIG. 8

| Word | Byte0 | Byte1 | Byte2 | Byte3 |
|---|---|---|---|---|
| 0 | JNL GROUP STATE | | | |
| 1 | | JVOL VALID/INVALID BIT MAP | | |
| 2 | | | JVOL VOLUME NO | JNL GROUP NO |
| 3 | | | | |
| ... | | (FOR EXAMPLE, VARIOUS SEQ#) | | |
| 2127 | | JVOL VALID/INVALID BIT MAP (2048 WORD) | | |
| 2128 | OPEN M*N VALID FLAG | FREEZE INFORMATION | RESERVED | RESERVED |
| 2129 | FREEZE STATE SETTING TIME | | | |
| 2130 | P SITE RECEIPT TS# | | | |
| 2131 | RESTORE PERMISSION TS# | | | |
| 2132 | ARRIVAL COMPLETION TS# | | | |
| 2133 | RESTORE COMPLETION TS# | | | |

MANUFACTURE NO. OF COMMAND ISSUANCE SITE DEVICE

EXAMPLE)
    #UnitID  #0(Serial#  64034),#1(Serial#  64045)

---

COMMAND DEVICE NO.: Serial#  64034
COMMAND DEVICE NO.: Serial#  64045

---

DEVICE NO.
EXAMPLE)

| #dev_group | dev_name | Serial# | LDEV# |
|---|---|---|---|
| ora | data0 | 64034 | 400 |
| ora | data1 | 64034 | 401 |
| ora | data2 | 64045 | 400 |
| ora | data3 | 64045 | 401 |

---

TIME STAMP ISSUANCE INTERVAL

EXAMPLE)

| #dev_group | interval(10ms) | mode |
|---|---|---|
| ora | 300 | run |

| BYTE | CONTENT |
|---|---|
| 0 | COMMAND CODE |
| 1 | JOURNAL GROUP NO. |
| 2~3 | RESERVED |
| 4~7 | TS# (ID#) |
| 8~63 | RESERVED |

FIG. 18

JNCB

```
UPDATE TIME

UPDATE POSITION INFORMATION

# (P SITE RECEIPT TS#)

SEQUENCE NO (SEQ#)
```

FIG. 19

```
RD-JNL MODE

JNL GROUP NO

RESTORE COMPLETION TS#

ARRIVAL COMPLETION TS#
```

FIG. 20

```
JNL GROUP STATE

MICRO VERSION

P SITE RECEIPT TS#

ARRIVAL COMPLETION TS#

RESTORE COMPLETION TS#
```

COMPUTER SYSTEM AND METHOD FOR PERFORMING REMOTE COPY USING JOURNAL

CROSS REFERENCES TO RELATED APPLICATIONS

This application relates to and claims priority from Japanese Patent Application No. 2008-272590, filed on Oct. 23, 2008, the entire disclosure of which is incorporated herein by reference.

BACKGROUND OF THE INVENTION

1. Field of the Invention

The present invention relates to remote copy using a journal.

2. Description of the Related Art

For example, Patent Document 1 discloses a technique in which a primary storage system receives write data from a primary host computer and reports to the primary host computer that the receipt of write data has been completed immediately after the write data was received. Thereafter, the host computer reads a copy of the write data from the primary storage system. The write data is associated with a write time which is a time at which a write request for the write data is issued, and, when the write data is read by the primary host computer, the write time is passed to the primary host computer. In addition, the primary host computer sends the write data and the write time to a secondary host computer. Upon receiving the write data and the write time, the secondary host computer writes information such as the write time in a control volume of a secondary storage system and further writes the write data in the secondary storage system in a sequence of write time by referring to the write time associated with or corresponding to the write data.

[Patent Document 1] Europe Patent Application Publication No. 0672985

SUMMARY OF THE INVENTION

In the technique disclosed in Patent Document 1, data consistency is maintained by using the write time (time stamp) associated with the write data. This technique cannot be applied to a computer system of which a host computer does not associate a write time to the write data. Specifically, for example, although the technique disclosed in Patent Document 1 may be applied to a computer system having a computer which can associate a write time to a write request, this technique cannot be applied to a computer system having an open system computer which does not associate a write time to the write request.

It is therefore an object of the invention to maintain consistency of data stored in a secondary storage system although a time stamp is not associated with write data received by a primary storage system.

At least one of one or more computers includes a storage managing unit. The storage managing unit increments a time stamp number (TS#) and issues the incremented TS# to each of one or more (for example, two or more) primary storage systems at intervals. Upon receiving a write command from one of the one or more computers, each of the one or more primary storage systems writes write data in its corresponding own primary volume, prepares a journal (JNL) including journal data, which is a replica of the write data, and the TS# most recently received from the storage managing unit, stores the prepared journal in its corresponding own primary journal memory region, and transmits the journal to a secondary storage system among one or more secondary storage systems, which includes a secondary volume, among secondary volumes, being paired with the own primary volume. Each of the one or more secondary storage systems receives a journal, writes the received journal in its corresponding own secondary journal memory region among the secondary journal memory regions, and writes journal data, in its corresponding own secondary volume among the secondary volumes, included in journals a particular journal through an oldest non-written journal among non-written journals stored in the own secondary journal memory region. Each of the non-written journals is a journal of which journal data have not yet been written in a secondary volume among the secondary volumes. The oldest non-written journal stored in the own secondary journal memory region is a non-written journal including the smallest TS# among TS#s included in the non-written journals stored in the own secondary journal memory region. The particular journal stored in the own secondary journal memory region is a journal including an TS#, among TS#s included in the non-written journals stored in the own secondary journal memory region, which is an small TS# next to the smallest arrival completion TS# among arrival completion TS#s in the one or more secondary storage systems. For each of the one or more secondary storage systems, an arrival completion TS# is the largest TS# among TS#s which are included in journals which have already been received.

BRIEF DESCRIPTION OF THE DRAWINGS

In the following description and in the drawings, a storage system is symbolized by Disk Controller (DKC), a primary DKC is symbolized by "PDKC," and a secondary DKC is symbolized by "SDKC." In addition, the terms "write" and "read" may be sometimes abbreviated as "WR" and "RD," respectively.

FIG. 6A is a view showing an example of configuration of a pair management table 57P1.

FIG. 6B is a view showing an example of configuration of a pair management table 57S1.

FIG. 8 is a view showing a configuration of a JNL group management table.

FIG. 14 is a view showing an example of a definition file used by Raid Manager (RM).

FIG. 18 is a view showing examples of information elements included in JNL management information (JNCB).

FIG. 19 is a view showing examples of information elements included in an RD-JNL command parameter.

FIG. 20 is a view showing examples of information elements included in response information to a state acquisition command from RM.

DETAILED DESCRIPTION OF PREFERRED EMBODIMENTS

Hereinafter, an embodiment of the present invention will be described with reference to the drawings.

To begin with, an outline of this embodiment will be described with reference to FIGS. 1 to 3.

Figure 1:
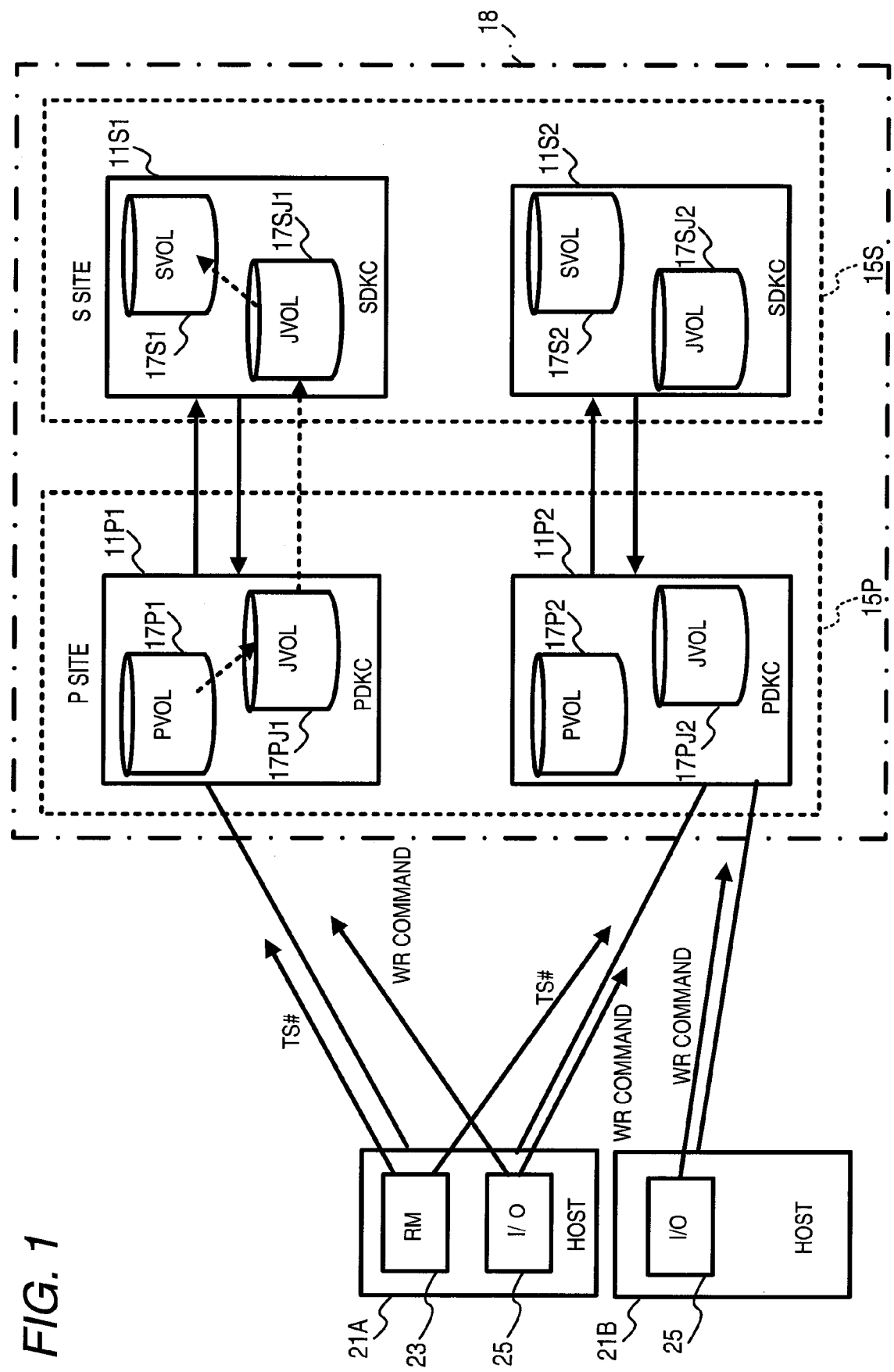
FIG. 1 shows an example of configuration of a computer system according to an embodiment of the present invention.

FIG. 1 shows an example of configuration of a computer system according to an embodiment of the present invention.

There is provided a DKC group 18, and the DKC group 18 has the form of an M×N matrix. That is, the DKC group 18 includes M PDKCs belonging to a primary site (P site) 15P and N SDKCs belonging to a secondary site (S site) 15S. M is an integer equal to or larger than one and N is also an integer equal to or larger than one. As for each of M PDKCs, at least one SDKC is connected to a PDKC and, as for each of N SDKCs, at least one PDKC is connected to a SDKC. One SDKC may be connected to two PDKCs. In this embodiment, the DKC group 18 includes two PDKCs (M=2) 11P1 and 11P2, and two SDKCs (N=2) 11S1 and 11S2. The PDKCs and the SDKCs are interconnected in a one-to-one correspondence. That is, the PDKC 11P1 is connected to and communicates with the SDKC 11S1 and the PDKC 11P2 is connected to and communicates with the SDKC 11S2.

The PDKC 11P1 includes a PVOL 17P1 and a JVOL 17PJ1 and the PDKC 11P2 includes a PVOL 17P2 and a JVOL 17PJ2. The SDKC 11S1 includes a JVOL 17SJ1 and an SVOL 17S1 and the SDKC 11S2 includes a JVOL 17SJ2 and an SVOL 17S2.

Here, "PVOL," which is an abbreviation of a primary volume, refers to a logical volume designated by a write command from a host. Write data according to the write command are written in the PVOL designated by the write command, in response to the write command.

"JVOL," which is an abbreviation of a journal volume, refers to a logical volume in which a journal (JNL) is written. "JNL" is information indicating an update history of PVOL, for example, information including JNCB and JNL data. "JNCB" is management information related to JNL (JNL group management information). The JNCB includes, for example, a sequence number (SEQ#) indicating an order at which JNL having the JNCB is prepared, update position information indicating a position (for example, a block) of a PVOL in which write data corresponding to JNL data in the JNL are written, a P site receipt TS# which will be described later, etc. "JNL data" is a replica of write data.

"SVOL," which is an abbreviation of a secondary volume, a SVOL refers to a logical volume paired with a PVOL. In the SVOL, the JNL data, which are a replica of the write data stored in the paired PVOL, are written.

Any logical volume of PVOLs, JVOLs and SVOLs is a logical storage devices formed on the basis of a plurality of HDDs (Hard Disk Drives) (or another kind of physical storage devices such as flash memories) of the DKC.

The computer system further includes a plurality of host computers (hereinafter abbreviated as "host"), for example, two hosts 21A and 21B. The hosts 21A and 21B include their respective Input/output (I/O) issuing units 25. Each I/O issuing unit 25 is implemented by an application program and/or an operating system (OS). The OS is an OS of an open system. The I/O issuing unit 25 transmits an I/O command, i.e., a write command (WR command) or a read command (RD command). In the I/O command, a PVOL as an I/O destination (specifically, for example, a set of a port number and a LUN (Logical Unit Number)) is designated.

Only one host 21A of the hosts 21A and 21B is equipped with a RAID manager (RM) 23 and at least the host 21A is connected to both of the PDKCs 11P1 and 11P2. The RM 23 is a computer program executed by a microprocessor and issues a time stamp number (TS#) to both of the PDKCs 11P1 and 11P2 regularly. The TS# is a number, not time. The TS# may be either issued to each of the PDKCs in order or transmitted to both of the PDKCs 11P1 and 11P2 simultaneously. The same first TS# may be transmitted to both of the PDKCs 11P1 and 11P2 at a time. At the next time, a TS# next to the last TS# (a number of (the TS# at the last time)+1) is transmitted to both of the PDKCs 11P1 and 11P2. Whenever receiving the TS#, each of the PDKCs 11P1 and 11P2 updates the P site receipt TS# to the received TS#. As a result, in each of the PDKCs 11P1 and 11P2, the newest TS# among one or more received TS# is managed as the P site receipt TS#.

Hereinafter, a process performed by the PDKC 11P1 and the SDKC 11S1 will be described with a set of the PDKC 11P1 and SDKC 11S1 as a main example.

Upon receiving the WR command, the PDKC 11P1 performs the following two operations (1-1) and (1-2):

(1-1) writing the WR data according to the WR command in the PVOL 17P1 specified by the WR command; and (1-2) preparing JNL including JNL data as a replica of the WR data and writing the JNL in the JVOL 17PJ1.

A JNCB in the JNL prepared in the (1-2) operation includes a SEQ# of the JNL, update position information (for example, an ID of PVOL of a WR destination of the WR data (for example, LUN or a number of the PVOL) and an address of a WR destination block in the PVOL) and the P site receipt TS# managed by the PDKC 11P1 which received the WR command.

The PDKC 11P1 transmits JNL, which has not yet been transmitted to the SDKC 11S1, of JNLs stored in the JVOL 17PJ1, to the SDKC 11S1.

Upon receiving the JNL transmitted from the PDKC 11P1, the SDKC 11S1 writes the received JNL in the JVOL 17SJ1.

In addition, the SDKC 11S1 reflects JNL, which has not yet been reflected in the SVOL 17S1, of the JNLs stored in the JVOL 17SJ1, in the SVOL 17S1. The phrase "reflects JNL" means that JNL data in the JNL are written in the SVOL paired with the PVOL specified by the update position information of the JNCB in the JNL, that is, the data are restored in the SVOL. At that time, a WR destination of the JNL data becomes a block (in the SVOL) of the same address as or an address corresponding to a WR destination block address specified by the update position information. The reflection of the JNL is carried out in a SEQ# order of the JNL.

Figure 2:
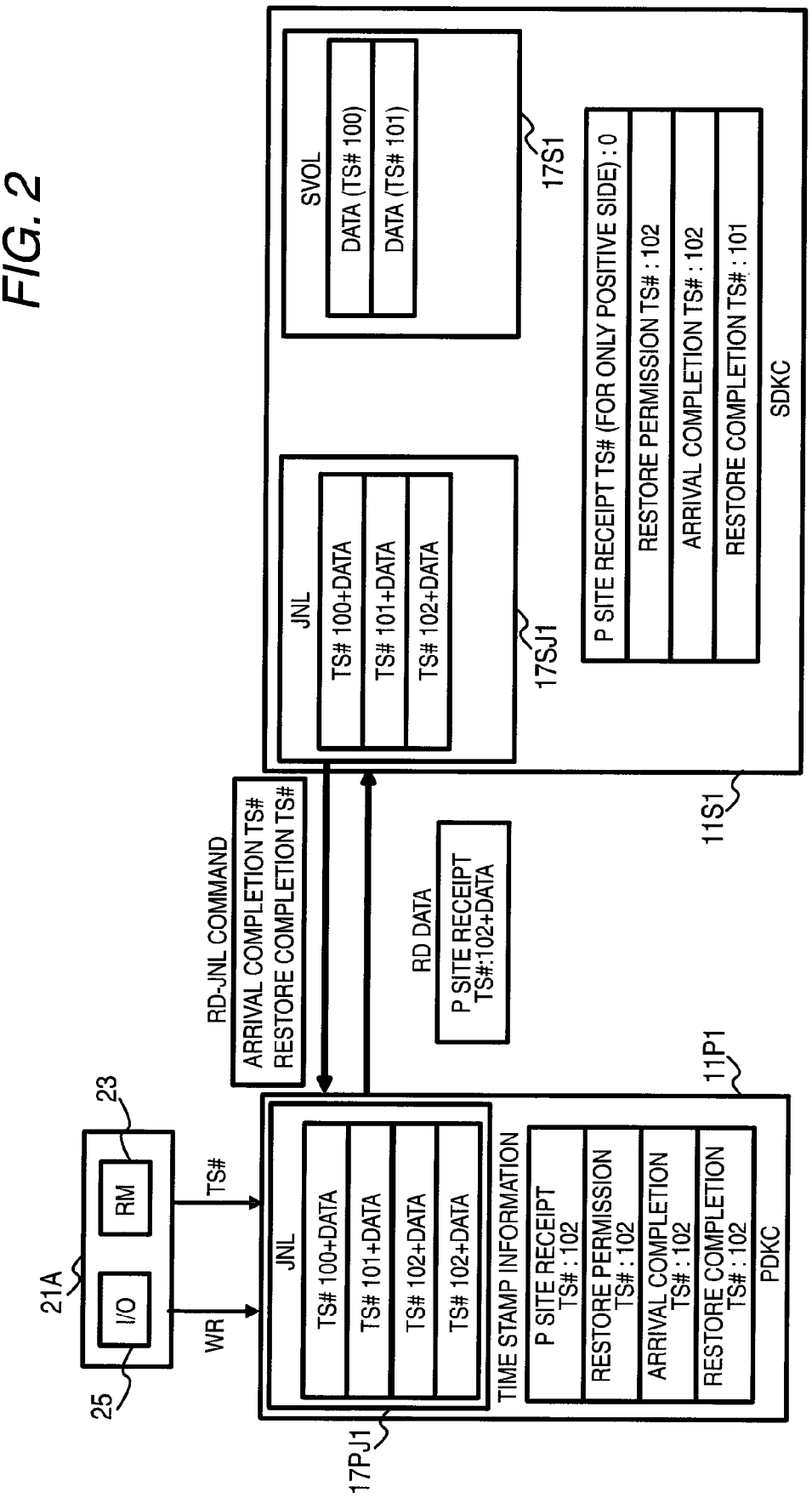
FIG. 2 is an explanatory view of an exchange between PDKC and SDKC.

As shown in FIG. 2, the SDKC 11S1 manages a restore permission TS#, an arrival completion TS# and a restore completion TS#. "Restore permission TS#" refers to a TS# used to specify how far JNL can be reflected (the restore permission TS# will be described in detail later). "Arrival completion TS#" refers to TS# of the newest JNL (JNL having the newest SEQ#) of received JNLs. "Restore completion TS#" refers to TS# of the newest JNL (JNL having the newest SEQ#) of JNLs reflected in the SVOL 17S1.

As shown in FIG. 2, the PDKC 11P1 transmits a JNL in response to an RD-JNL command from the SDKC 11S1. Specifically, for example, the SDKC 11S1 transmits the RD-JNL command to the PDKC 11P1 at regular or irregular intervals. "RD-JNL command" refers to an RD command of JNL. The SDKC 11S1 includes the arrival completion TS# and the restore completion TS#, which are managed by the SDKC 11S1, in the RD-JNL command. Upon receiving the RD-JNL command, the PDKC 11P1 performs the following two operations (2A-1) and (2A-2):

(2A-1) storing the arrival completion TS# and the restore completion TS# in the RD-JNL command; and
(2A-2) transmitting a JNL, which has not yet been transmitted to the SDKC 11S1, of the JNLs stored in the JVOL 17PJ1, to the SDKC 11S1, as RD data for the RD-JNL command.

In the RD-JNL command may be specified a SEQ# of a JNL next to the newest JNL of the JNLs received by the SDKC 11S1 (the newest JNL of the JNLs stored in the JVOL 17SJ1). In this case, the JNL having the SEQ# may be read from the JVOL 17PJ1, transmitted from the PDKC 11P1 to the SDKC 11S1, and written in the JVOL 17SJ1.

Upon receiving a JNL as RD data from the PDKC 11P1, the SDKC 11S1 performs the following two operations (2B-1) and (2B-2):

(2B-1) storing a TS# in the received JNL as the arrival completion TS#; and
(2B-2) writing the received JNL in the JVOL 17SJ1.

Additionally, as shown in FIG. 2, a P site arrival TS# is not managed or managed as a null value "0" in the SDKC 1151.

In addition, when a non-reflected JNL in the JVOL 17SJ1 is reflected in the SVOL 17S1, the SDKC 11S1 stores a TS# in the reflected JNL as the restore completion TS#.

As the arrival completion TS# and the restore completion TS# managed by the SDKC 11S1 (11S2) are included in the RD-JNL command of a destination of the PDKC 11P1 (11P2), the arrival completion TS# and the restore completion TS# are transmitted to and stored in the PDKC 11P1 (11P2). As shown in FIG. 3, the arrival completion TS# stored in the PDKC 11P1 (11P2) is transmitted from the PDKC 11P1 (11P2) to the RM 23.

Figure 3:
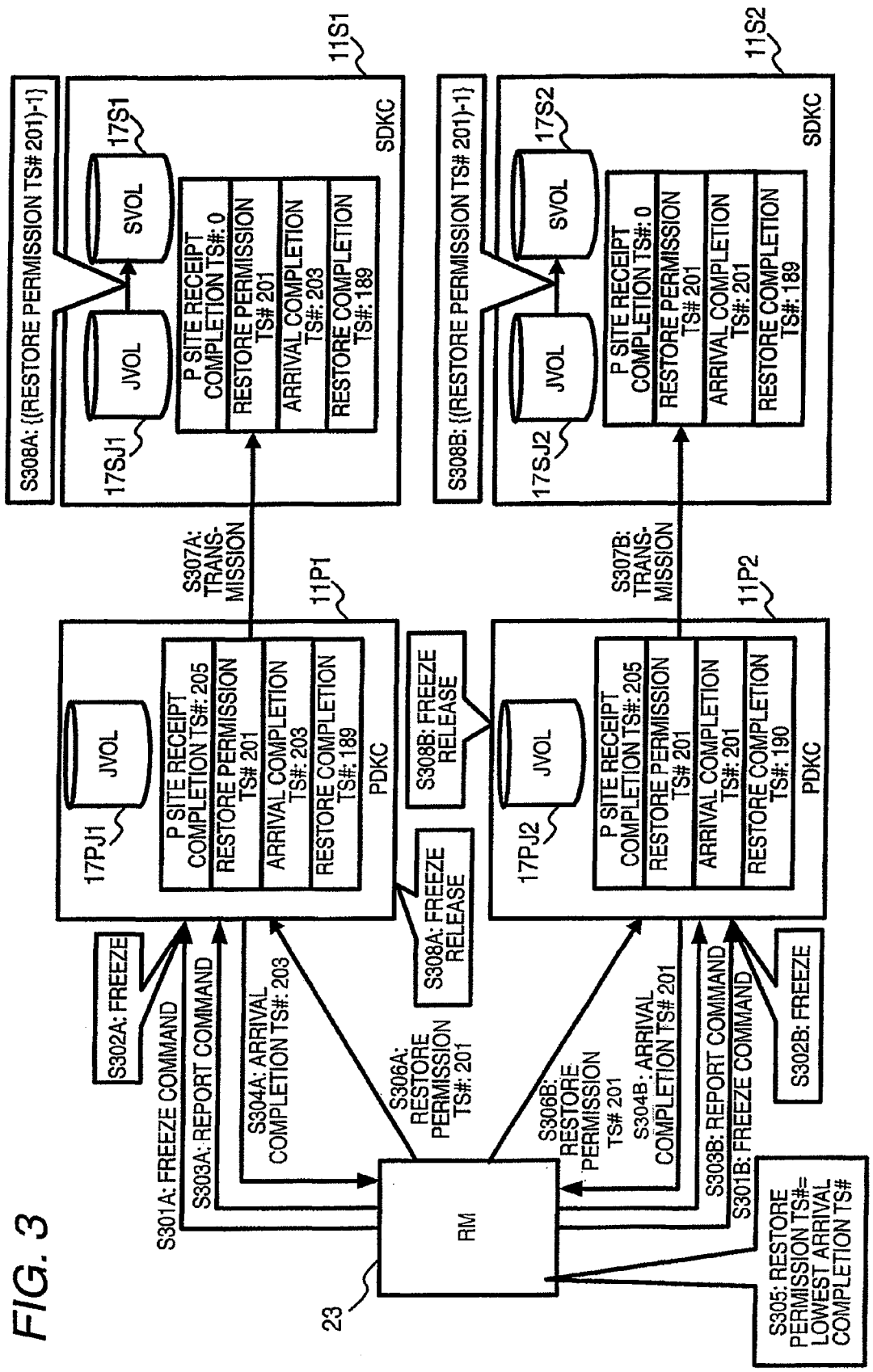
FIG. 3 is a view showing an outline of setting of restore permission Time Stamp Number (TS#) and restore process.

That is, as shown in FIG. 3, the RM 23 first transmits a freeze command to the PDKCs 11P1 and 11P2 (S301A and S301B). "Freeze command" refers to a command to reserve an I/O process. The PDKCs 11P1 and 11P2 which received the freeze command enter into a freeze state (S302A and S302B) during which, although the PDKCs 11P1 and 11P2 receive an I/O command from the host 21A or 21B, the PDKCs 11P1 and 11P2 do not perform an I/O operation for the PVOL specified by the I/O command (for example, the PDKCs 11P1 and 11P2 do not respond to the host 21A or 21B although the PDKCs 11P1 and 11P2 receive the I/O command from the host 21A or 21B).

Next, the RM 23 transmits a report command (a state acquisition command to be described later) to the PDKCs 11P1 and 11P2 (S303A and S303B). Upon receiving the report command, the PDKC 11P1 (and 11P2) transmit an arrival completion TS#203 (arrival completion TS#201) managed by the PDKC 11P1 (11P2) to the RM 23 (S304A (S304B)).

The RM 23 determines the lowest value 201 of the two arrival completion TS#s received from the PDKCs 11P1 and 11P2, as a restore permission TS#201 (S305).

The RM 23 transmits the restore permission TS#201 to the PDKCs 11P1 and 11P2 (S306A and S306B). The PDKC 11P1 (11P2) stores the restore permission TS#201 received from the RM 23 and transmits the stored restore permission TS#201 to the SDKC 11S1 (11S2) (S307A (S307B)). The SDKC 11S1 (11S2) stores the received restore permission TS#201.

The SDKC 11S1 (11S2) reflects a JNL up to a JNL having a TS#, which is smaller by one than the restore permission TS#201 (that is, a TS#200), of or included in non-reflected JNLs stored in the JVOL 17SJ1 (17SJ2), in the SVOL 17S1 (17S2) in a SEQ# order (S308A (S308B)).

Hitherto, the outline of this embodiment has been described. In the above description, at least one of the following items (3-1) to (3-4) may be employed.

(3-1) At least one of the arrival completion TS# and the restore completion TS# may be communicated from the SDKC 11S1 (11S2) to the RM 23. However, as described previously, when the arrival completion TS# and the restore completion TS# are communicated to the RM 23 via the PDKC 11P1 (11P2), the host 21A having the RM 23 may not be connected to the SDKC 11S1 (11S2) (or its connection may not be changed).

(3-2) The restore permission TS# itself may be a TS# smaller by one than the lowest value of the arrival completion TS#. In this case, at S308A and S308B, a JNL which has a TS# up to the restore permission TS# is reflected in the SVOL.

(3-3) The RM 23 may be equipped in a management computer for managing the PDKCs 11P1 and 11P2, which is not a host.

(3-4) A JNCB in a JNL may be managed as a memory region (for example, a memory in a controller of the DKC) other than the JVOL.

As can be seen from the above description, it is possible to maintain conformability of data stored in one or more SDKCs although a host cannot grant a time stamp to a WR command.

Hereinafter, this embodiment will be described in detail.

Figure 4:
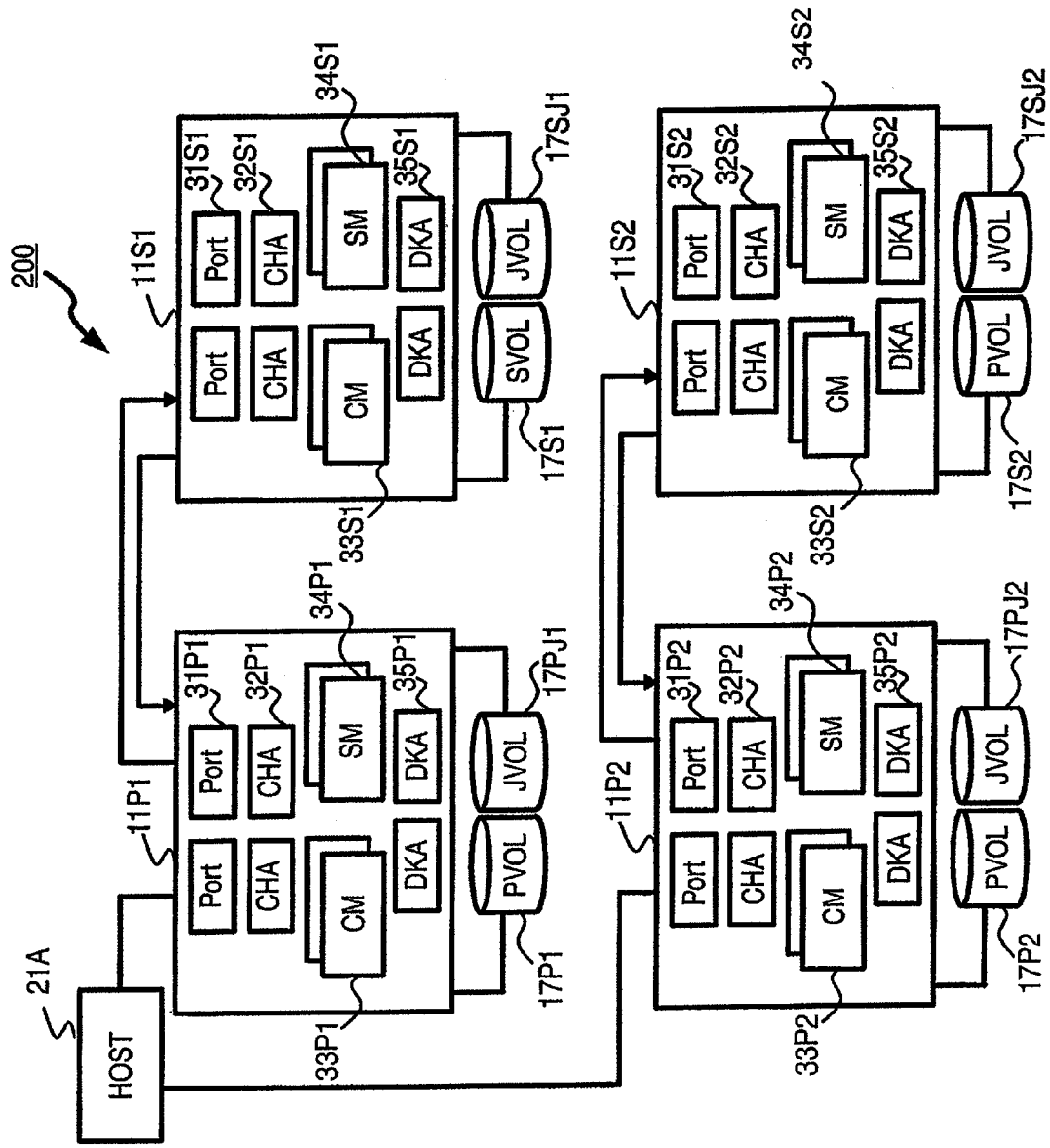
FIG. 4 is a view showing a configuration of each Disk Controller (DKC).

FIG. 4 shows a configuration of each DKC included in the computer system 200.

As described above, at least the host 21A is connected to the PDKCs 11P1 and 11P2, and the PDKC 11P1 (11P2) and the SDKC 11S1 (11S2) communicate with each other.

Although the DKCs 11P1, 11P2, 11S1 and 11S2 may have the same configuration or different configurations, it is assumed in this embodiment that they have the same configuration. Specifically, for example, the PDKC 11P1 (11P2, 11S1 and 11S2) has a plurality of physical memory devices as basic logical volumes and a controller for controlling an I/O for the plurality of physical memory devices. The controller includes, for example, a plurality of ports 31P1 (31P2) (although shown separate from the port in FIG. 4) (31S1 and 31S2), a plurality of Channel Adapters (CHAS) 32P1 (32P2, 32S1 and 32S2), a plurality of Cache Memories (CMs) 33P1 (33P2, 33S1 and 33S2), a plurality of Share Memories (SMs) 34P1 (34P2, 34S1 and 34S2) and a plurality of Disk Adapters (DKAs) 35P1 (35P2, 35S1 and 35S2).

The port 31P1 (31P2) receives a TS# from the host 21A or an I/O command from the host 21A and/or 21B. The port 31S1 (31S2) receives RD data (JNL) from the PDKC 11P1 (11P2).

CHA is an abbreviation of a channel adapter. The CHA 32P1 (32P2) is an interface device which includes the port 31P1 (31P2), a microprocessor, a memory and so on and controls communication with the hosts 21A and 21B. At least one of the plurality of CHAS 32P1 (32P2) is connected to the port 31S1 (31S2) of the CHA 3251 (32S2) and controls communication with the CHA 32S1 (32S2) (communication with the SDKC 11S1 (11S2)).

CM is an abbreviation of a cache memory. The CM 33P1 (33P2) is a memory which temporarily stores data (WR data and RD data) exchanged between the PVOL 17P1 (17P2) and the hosts 21A and 21B. The CM 33S1 (33S2) is a memory which temporarily stores data to be written in or read from the SVOL 17S1 (17S2).

SM is an abbreviation of a share memory. The SM 34P1 (34P2, 34S1 and 34S2) is a memory accessed by the CHA 32P1 (32P2, 32S1 and 32S2) and the DKA 35P1 (35P2, 35S1 and 35S2). The SM 34P1 (34P2, 34S1 and 3452) store a variety of management information. The management information may include, for example, configuration information of the DKC 11P1 (11P2, 11S1 and 11S2) (for example, information indicating which VOL is formed on the basis of which physical memory device, an ID of the VOL, etc.), a pair management table and a JNL group management table (which will be described later).

DKA is an abbreviation of a disk adapter. The DKA 35P1 (35P2, 35S1 and 35S2) is an interface device which includes a microprocessor, a memory, etc. and controls communication with physical memory devices.

Hereinafter, the function of the PDKC 11P1 and SDKC 11S1 will be described by the examples of PDKC 11P1 and SDKC 11S1.

Figure 5:
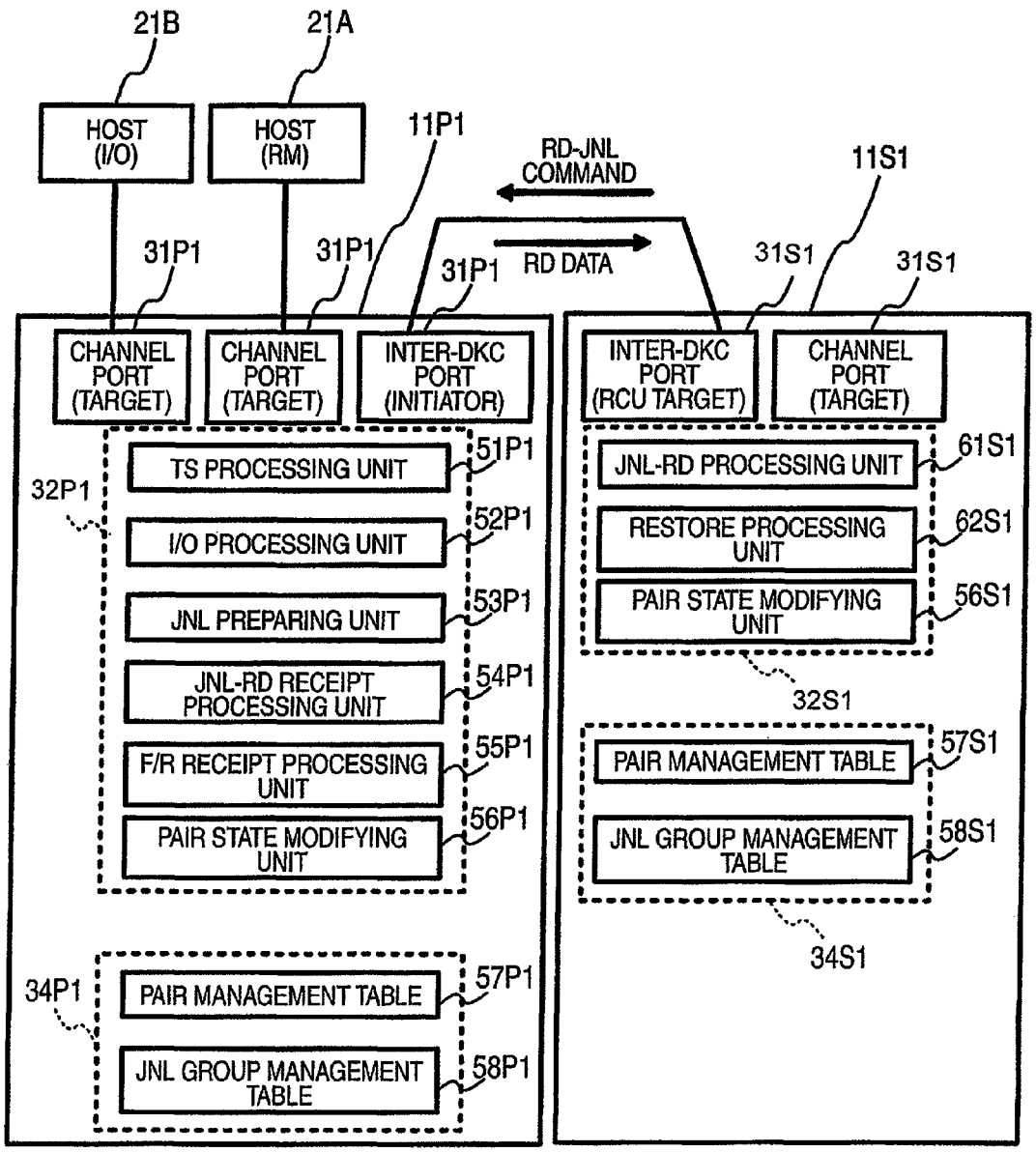
FIG. 5 is a view showing a functional block of Primary DKC (PDKC) and a functional block of Secondary DKC (SDKC).

FIG. 5 shows a functional block of the PDKC 11P1 and a functional block of the SDKC 11S1.

At least one of the plurality of ports 31P1 is connected to the host 21A and at least one of the plurality of ports 31P1 is connected, as an inter-DKC port (initiator port), to the port 31S1 as an inter-DKC port (target port) via, for example, a cable for fibre channel. The RD-JNL command and the RD data are transmitted/received via this inter-DKC port.

In the PDKC 11P1, for example, the CHA 32P1 includes a TS processing unit 51P1, an I/O processing unit 52P1, a JNL preparing unit 53P1, a JNL-RD receipt processing unit 54P1, a F/R receipt processing unit 55P1 and a pair state modifying unit 56P1 and the SM 34P1 stores a pair management table 57P1 and a JNL group management table 58P1. On the other hand, in the SDKC 11S1, for example, the CHA 32S1 includes a JNL-RD processing unit 61S1, a restore processing unit 62S1 and a pair state modifying unit 56S1 and the SM 34S1 stores a pair management table 57S1 and a JNL group management table 58S1. Each of the above components 51P1 to 56P1, 61S1, 62S1 and 56S1 is, for example, a computer program executed by a microprocessor, but all or some of at least one of the components may be configured as hardware.

The TS processing unit 51P1 processes a TS# from the RM 23.

The I/O processing unit 52P1 processes an I/O according to an I/O command from a host.

The JNL preparing unit 53P1 prepares a JNL including JNL data, which are a replica of WR data written in the PVOL 17P1, etc., and writes the prepared JNL in the JVOL 17PJ1.

The JNL-RD receipt processing unit 54P1 reads the JNL from the JVOL 17PJ1 in response to an RD-JNL command.

The F/R receipt processing unit 55P1 performs a process in response to a freeze command and a RUN command from the RM 23. The term "RUN command" used herein refers to a command to release a freeze state.

The pair state modifying unit 56P1 (56S1) modifies a pair state of the PVOL 17P1 (17P2) and the SVOL 17S1 (17S2).

The JNL-RD processing unit 61S1 transmits the RD-JNL command.

The restore processing unit 62S1 reflects a non-reflected JNL stored in the JVOL 17SJ1 (17SJ2) in the SVOL 17S1 (17S2).

The pair management table 57P1 (57S1) is a table for managing a pair configuration of PVOL and SVOL and a pair state thereof.

The JNL group management table 58P1 (58S1) is a table for managing information related to a JNL group.

FIG. 6A shows an example of a configuration of the pair management table 57P1. FIG. 6B shows an example of a configuration of the pair management table 57S1.

With the pair management table 57P1 (57S1) are registered a volume number, a volume attribute, a JNL group number, a pair state, a counterpart volume number and a counterpart JNL group number for each PVOL (SVOL). Hereinafter, details of one VOL will be described by way of an example as an "object volume" with reference to FIGS. 6A and 6B.

The volume number refers to an identification number of an object volume. The volume number is associated with, for example, a LUN. Accordingly, for example, from a LUN specified by a WR command, a volume number associated with the LUN is specified, and a PVOL of a WR destination is specified from the specified volume number.

The volume attribute refers to an attribute of an object volume. A value representing the attribute may include, for example, "P" representing a PVOL and "S" representing a SVOL.

The JNL group number refers to an identification number of a JNL group to which an object volume belongs.

The pair state refers to a pair state of an object volume. Examples of the pair state may include "PAIR" meaning that a PVOL has the same contents as a SVOL, "Suspend" meaning that a copy of a PVOL to a SVOL is suspended, and "Copy" meaning that a copy of a PVOL to a SVOL is performed.

The counterpart volume number refers to an identification number of a volume paired with an object volume.

The counterpart JNL group number refers to an identification number of a JNL group paired with a JNL group to which an object volume belongs.

From the table 57P1 shown in FIG. 6A, it can be seen that, in the PDKC 11P1, a PVOL having a volume number "0000" is paired with a SVOL having a volume number "1000." On the other hand, from the table 57S1 shown in FIG. 6B, it can be seen that, in the SDKC 11S1, a SVOL having a volume number "1000" is paired with a PVOL having a volume number "0000."

Figure 7:
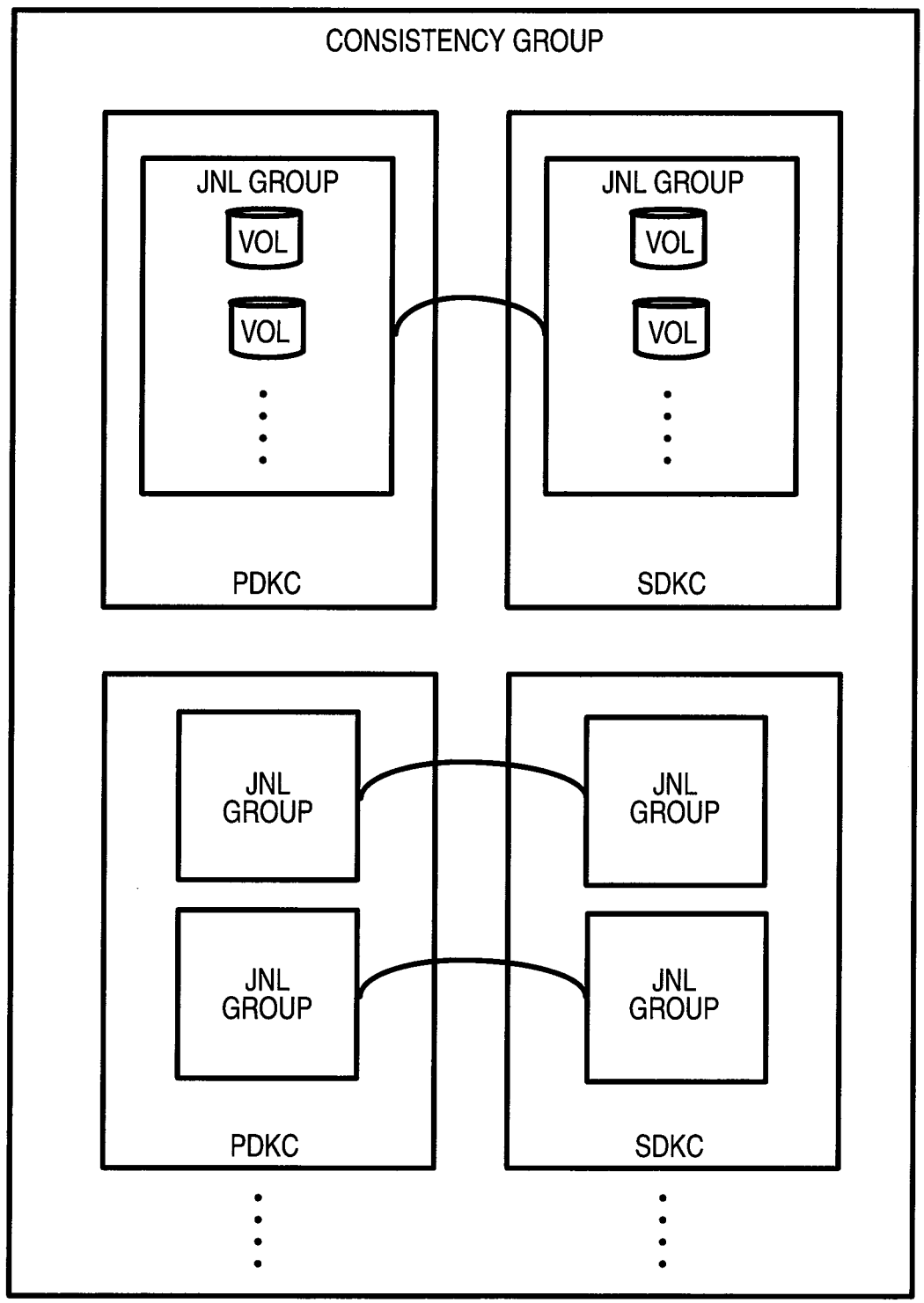
FIG. 7 is a view showing a relation between a JNL group and a consistency group.

Here, the JNL group will be described with reference to FIG. 7. The JNL group refers to a set of a plurality of VOLs in each DKC. The JNL group includes one or more JVOLs and one or more PVOLs (SVOLs). A JNL group in the PDKC is paired with a JNL group in the SDKC. A consistency group is formed by a plurality of JNL group pairs. In this embodiment, data conformability is maintained in this consistency group.

FIG. 8 shows an example of a configuration of the JNL group management table 58P1 (58S1).

The JNL group management table 58P1 (58S1) is a table prepared for each JNL group. Information elements included in the JNL group management table 58P1 (58S1) may include, for example, a JNL group state, a JNL group number, a JVOL volume number, various SEQ#s, an OPEN M*N valid flag, freeze information, freeze state setting time, a P site receipt TS#, a restore permission TS#, an arrival completion TS# and a restore completion TS#. Accordingly, the P site receipt TS#, the restore permission TS#, the arrival completion TS# and the restore completion TS# are managed for each JNL group in one DKC.

The JNL group state indicates the state of the JNL group, for example, "Active", "Valid" and so on.

The JNL group number refers to an identification number of a JNL group.

The various SEQ#s include, for example, a JNCB SEQ# which is a SEQ# of the newest prepared JNL.

The OPEN M*N valid flag refers to a flag set if there exist two or more PDKCs.

The freeze information refers to information indicating whether or not a JNL group is in a freeze state.

The freeze state setting time refers to a start time of the freeze state.

Hereinafter, a process performed in this embodiment will be described in detail.

Figure 9:
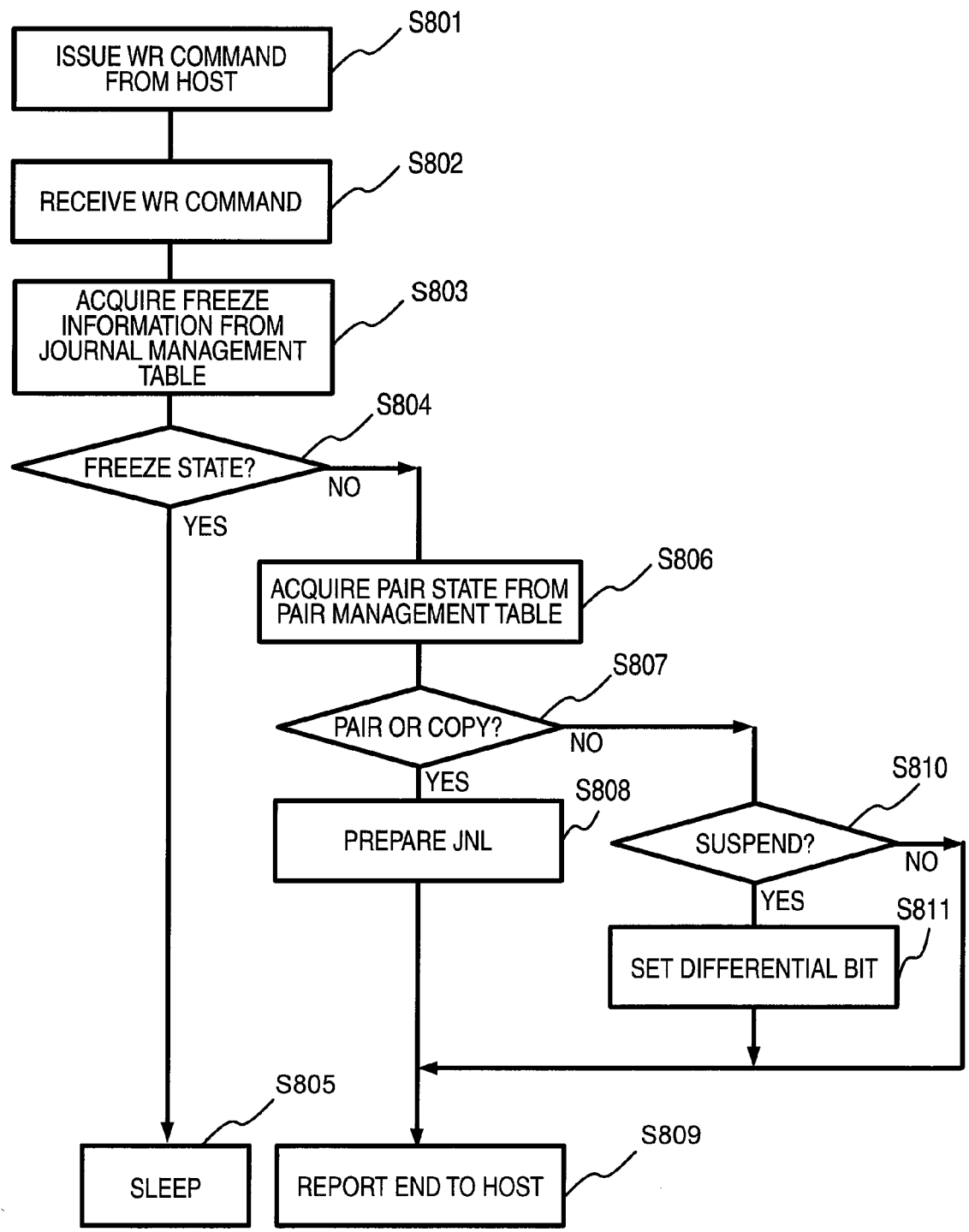
FIG. 9 is a flow chart showing a process performed by PDKC upon receiving a Write (WR) command.

FIG. 9 shows a process performed by a PDKC upon receiving a WR command. Hereinafter, this process will be described by way of an example using PDKC 11P1.

For example, if the host 21B issues a WR command (S801), the PDKC 11P1 receives the WR command (S802). The I/O processing unit 52P1 writes WR data according to the WR command in the CM 33P1.

The I/O processing unit 52P1 specifies a JNL group to which a PVOL designated by the received WR command (a WR destination PVOL) belongs, from the pair management table 57P1, and acquires freeze information in the JNL group management table 58P1 corresponding to the specified JNL group (S803).

If the freeze information acquired at S803 indicates a freeze state (YES in S804), the I/O processing unit 52P1 enters into a sleep state (S805). Specifically, a response to the WR command received at S802 cannot be transmitted from the I/O processing unit 52P1 to the host 21B.

If the freeze information acquired at S803 indicates no freeze state (NO in S804), the I/O processing unit 52P1 acquires a pair state corresponding to the WR destination PVOL from the pair management table 57P1 (S806).

If the pair state acquired at S806 is "PAIR" or "Copy" (YES in S807), the JNL preparing unit 53P1 prepares a JNL including a JNCB having JNL data, which is a replica of the WR data, and P site receipt TS# (S808). The prepared JNL is stored in the JVOL 17PJ1. The I/O processing unit 52P1 reports an end to the host 21B (S809). Information elements included in the JNCB include, for example, update time, which is time when the JNCB is prepared, update position information related to a write destination of the WR data, and SEQ#, in addition to the P site receipt TS#, as shown in FIG. 18.

If the pair state acquired at S806 is not "Pair" or "Copy" (NO in S807) and is "Suspend" (YES in S810), the I/O processing unit 52P1 sets a bit corresponding to a WR destination block according to the WR command as a differential bit in a differential bit map corresponding to a pair constituting a WR destination PVOL (S811). Thereafter, or if the pair sate is not "Suspend" in S810, the above-described S809 is performed.

Each of the bits constituting the differential bit map corresponds to each of the blocks constituting the PVOL. If the pair state is changed from "Suspend" to "Copy," a JNL including JNL data, which are a replica of data stored in a block (block in the PVOL), is prepared for each block corresponding to the differential bit, and the prepared JNL is stored in the JVOL 17PJ1.

Although not shown in FIG. 9, if NO in S804, the WR data are written in the WR destination block (block in the WR destination PVOL) designated by the WR command.

Figure 10:
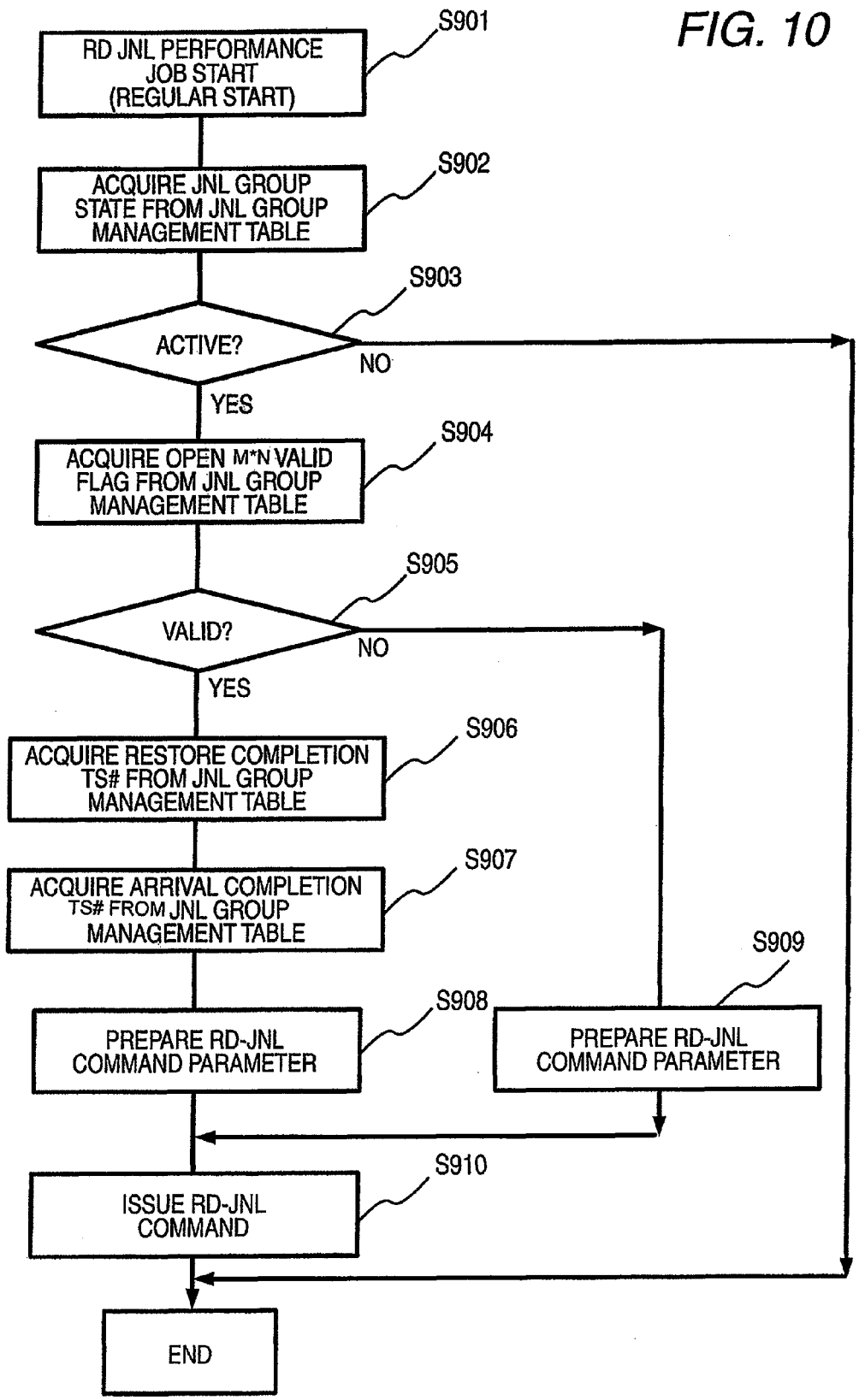
FIG. 10 is a flow chart showing a process performed by SDKC upon transmitting a Read Journal (RD-JNL) command.

FIG. 10 shows a process performed by a SDKC upon transmitting an RD-JNL command.

The JNL-RD processing unit 61S1 starts at regular intervals (S901).

The JNL-RD processing unit 61S1 acquires a JNL group state by referring to the JNL group management table 58S1 (S902).

If the JNL group state acquired at S902 is "Active" (YES in S903), the JNL-RD processing unit 61S1 acquires an OPEN M*N valid flag by referring to the JNL group management table 58S1 referred to at S902 (S904).

If the JNL group state acquired at S902 is not "Active" (NO in S903), processing proceeds to the end.

If the flag acquired at S904 does not indicate "Valid" (NO in S905), the JNL-RD processing unit 61S1 prepares an RD-JNL command parameter (S909) and issues an RD-JNL command including the parameter (S910).

If the flag acquired at S904 indicates "Valid" (YES in S905), the JNL-RD processing unit 61S1 acquires a restore completion TS# and an arrival completion TS# by referring to the JNL group management table 58S1 referred to at S902 (S906 and S907). Then, the JNL-RD processing unit 61S1 prepares an RD-JNL command parameter including the acquired restore completion TS# and arrival completion TS# (S908) and issues an RD-JNL command including the parameter (S910).

An example of information elements included in the RD-JNL command parameter is shown in FIG. 19. The RD-JNL command parameter prepared at S908 includes, for example, an RD-JNL mode, a JNL group number in a PDKC, the restore completion TS# and the arrival completion TS#. The RD-JNL mode is, for example, "Special read." On the other hand, the RD-JNL command parameter prepared at S909 does not include the restore completion TS# and the arrival completion TS#. In this case, the RD-JNL mode is "Normal read," "Retry read," or "Purge command." The JNL group number in the PDKC is a counterpart JNL group number corresponding to a JNL group number registered with the JNL group management table 58S1 referred to at S902 (a number specified from the pair management table 57S1).

Figure 11:
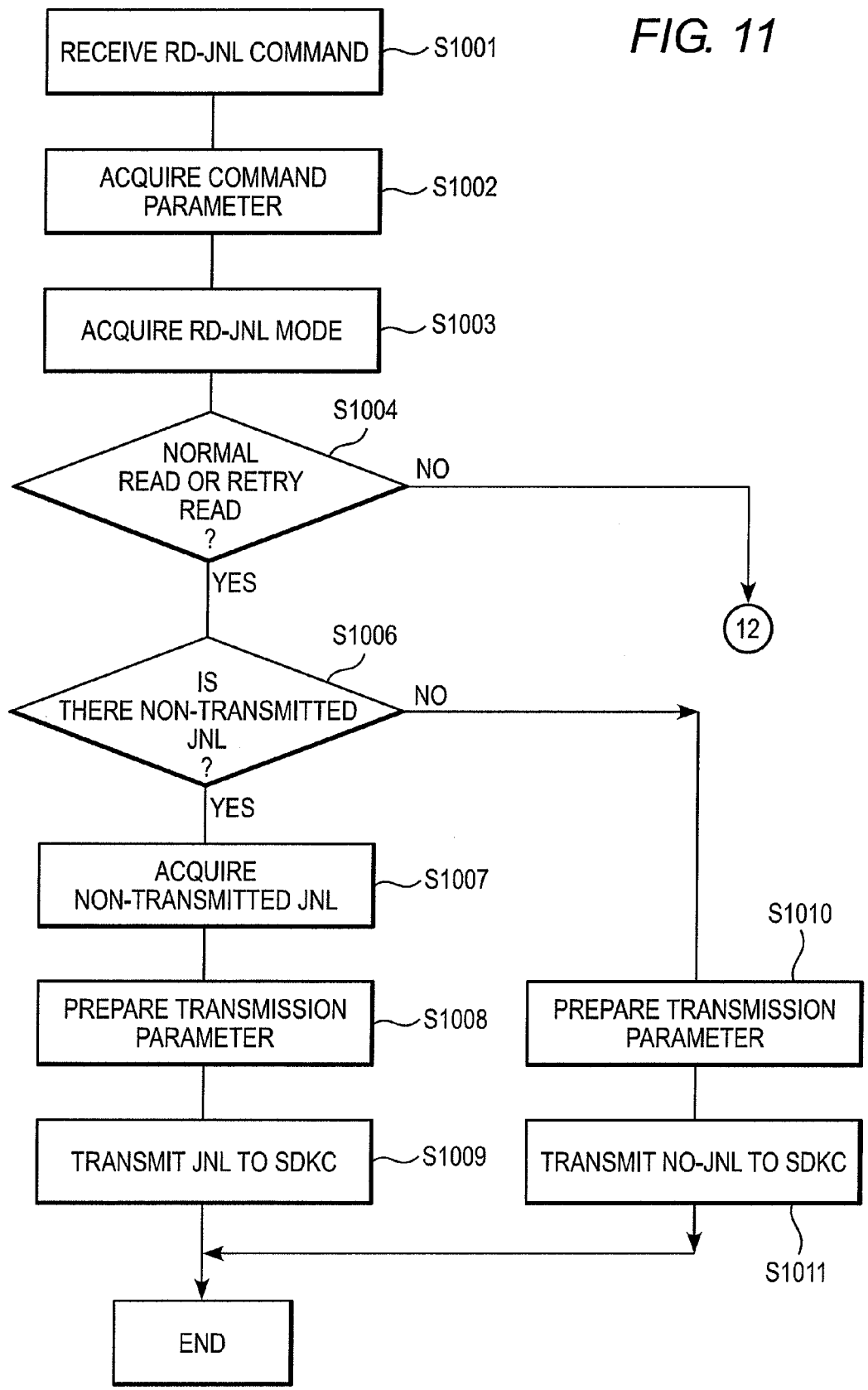
FIG. 11 is a part of a flow chart showing a process performed by PDKC upon receiving a RD-JNL command.
Figure 12:
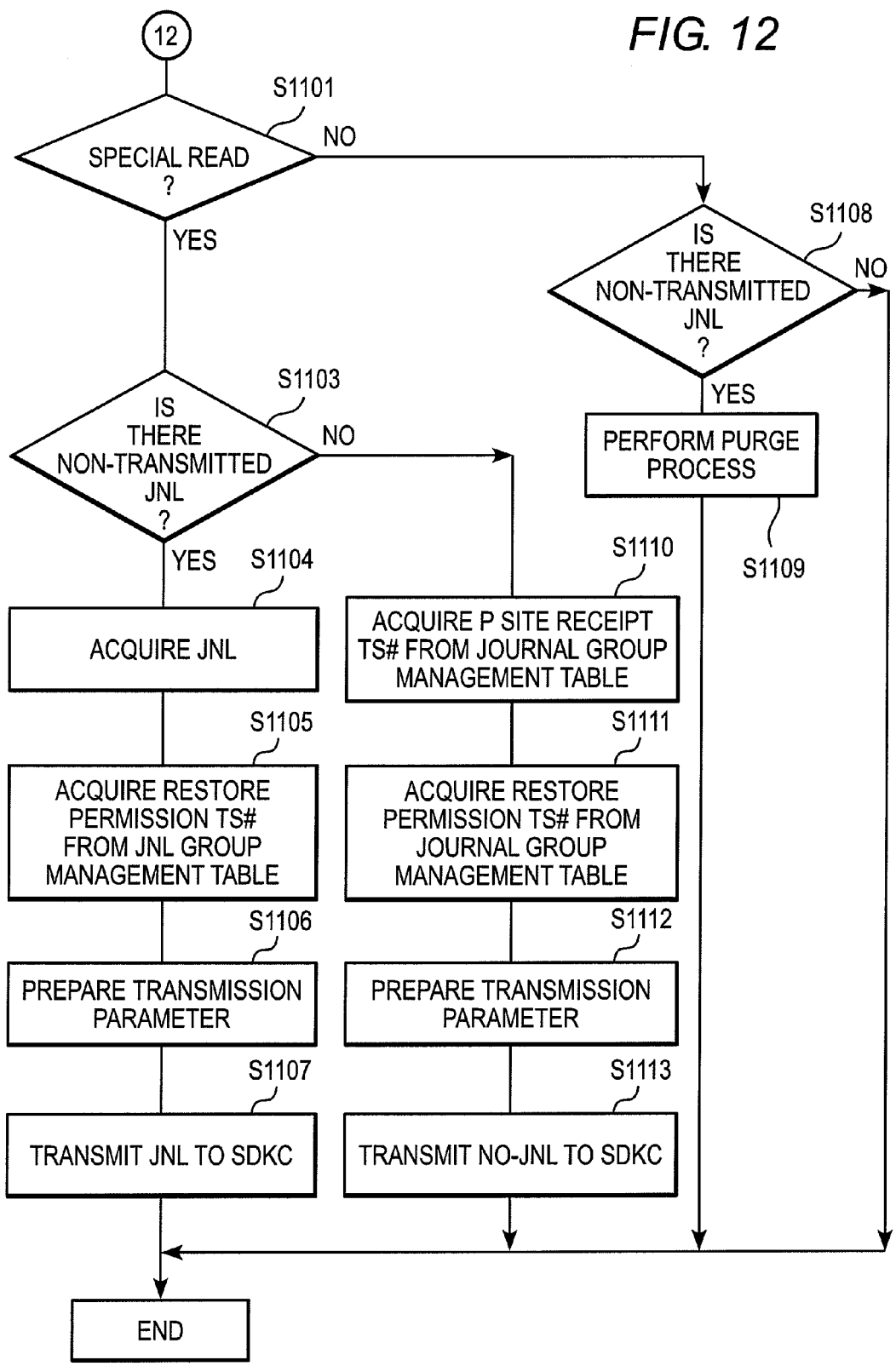
FIG. 12 is the remaining of a flow chart showing a process performed by PDKC upon receiving a RD-JNL command.

FIG. 11 shows a portion of a process performed by a PDKC upon receiving an RD-JNL command, and FIG. 12 shows the remaining part of the process.

As shown in FIG. 11, when the PDKC 11P1 receives the RD-JNL command from the SDKC 11S1 (S1001), the JNL-RD receipt processing unit 54P1 acquires a command parameter from the RD-JNL command (S1002) and acquires an RD-JNL mode from the parameter (S1003).

If the RD-JNL mode acquired at S1003 is "Normal read" or "Retry read" (YES in S1004) and if there exists a non-transmitted JNL (YES in S1006), the JNL-RD receipt processing unit 54P1 acquires the non-transmitted JNL from the JVOL 17PJ1 (S1007), prepares a transmission parameter (S1008) and transmits the JNL acquired at S1007 as RD data to the SDKC 11S1, along with the transmission parameter (S1009). On the other hand, if there is no non-transmitted JNL (NO in S1006), the JNL-RD receipt processing unit 54P1 prepares a transmission parameter (S1010) and transmits a NO-JNL (information indicating that there is no JNL) as RD data to the SDKC 11S1, along with the transmission parameter (S1011).

If the RD-JNL mode acquired at S1003 is "Purge command" (NO in S1004 and NO in S1101 of FIG. 12) and if there exists a JNL that has been transmitted in the JVOL 17PJ1 (YES in S1108), the JNL-RD receipt processing unit 54P1 performs a purge process to delete the JNL from the JVOL 17PJ1 (S1109), as shown in FIG. 12. If there is no JNL which has already been transmitted in the JVOL 17PJ1 (NO in S1108), then processing proceeds to the end.

If the RD-JNL mode acquired at S1003 is "Special read" (NO in S1004 of FIG. 11 and YES in S1101 of FIG. 12) and if there exists a non-transmitted JNL (YES in S1103), the JNL-RD receipt processing unit 54P1 acquires the JNL from the JVOL 17PJ1 (S1104), as shown in FIG. 12. In addition, the JNL-RD receipt processing unit 54P1 acquires a restore permission TS# from the JNL group management table 58P1 having a JNL group number in the parameter acquired at S1002 (S1105). The JNL-RD receipt processing unit 54P1 prepares a transmission parameter including the acquired restore permission TS#(S1106) and transmits the JNL acquired at S1104, as RD data, to the SDKC 11S1, along with the transmission parameter (S1107). On the other hand, if there is no non-transmitted JNL (NO in S1103), the JNL-RD receipt processing unit 54P1 acquires a P site receipt TS# and a restore permission TS# from the JNL group management table 58P1 having the JNL group number in the parameter acquired at S1002 (S1110 and S1111), prepares a transmission parameter including the acquired TS#s (S1112) and transmits a NO-JNL (information indicating that there is no JNL) as RD data to the SDKC 11S1, along with the transmission parameter (S1113).

Figure 13:
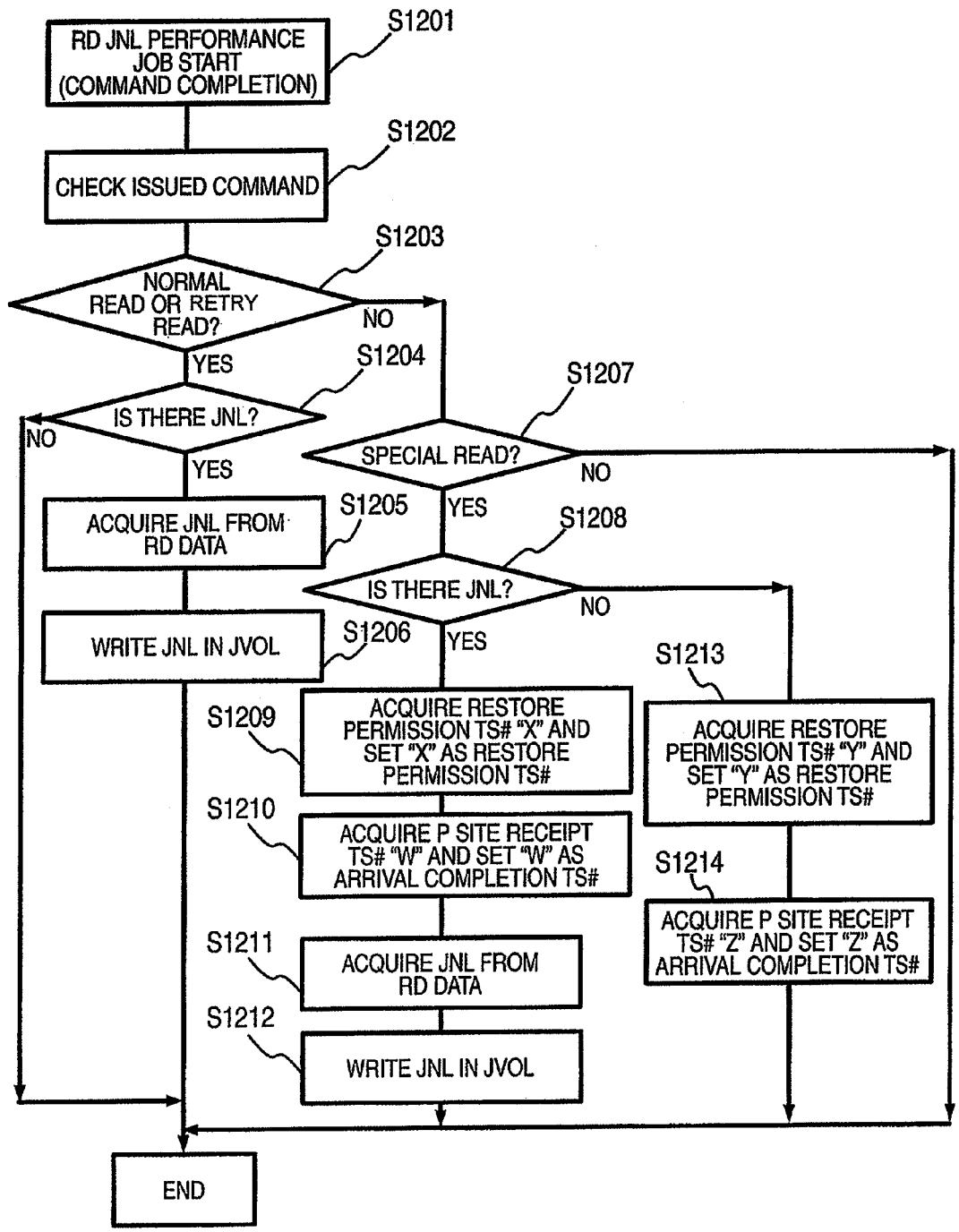
FIG. 13 is a flow chart showing a process performed by SDKC upon receiving RD data.

FIG. 13 shows a process performed by a SDKC upon receiving RD data.

When the SDKC 11S1 receives RD data from the PDKC 11P1 (command completion), the JNL-RD processing unit 6151 starts (S1201).

The JNL-RD processing unit 61S1 checks an issued RD-JNL command for the receipt of the RD data (S1202).

If the RD-JNL mode of the RD-JNL command checked at S1202 is "Normal read" or "Retry read" (YES in S1203) and if a JNL is included in the RD data (YES in S1204), the JNL-RD processing unit 61S1 acquires the JNL from the RD data (S1205) and writes the acquired JNL in the JVOL 17SJ1 (S1206).

If the RD-JNL mode of the RD-JNL command checked at S1202 is "Special read" (NO in S1203 and YES in S1207) and if a JNL is included in the RD data (YES in S1208), the JNL-RD processing unit 61S1 acquires a restore permission TS# (hereinafter "X" in FIG. 13) from the RD data and sets the acquired X as a restore permission TS# in the JNL group management table 58S1 corresponding to the RD-JNL command checked at S1202 (S1209). If the RD-JNL mode of the RD-JNL command checked at S1202 is not "Special read" (NO in S1203 and NO in S1207) processing proceeds to the end. In addition, the JNL-RD processing unit 61S1 acquires a P site receipt TS# (hereinafter "W" in FIG. 13) from the RD data and sets the acquired W as an arrival completion TS# in the JNL group management table 58S1 corresponding to the RD-JNL command checked at S1202 (S1210). In addition, the JNL-RD processing unit 61S1 acquires the JNL from the RD data (S1211) and writes the acquired JNL in the JVOL 17SJ1 (S1212). On the other hand, if no JNL is included in the RD data (NO JNL in S1208), the JNL-RD processing unit 61S1 acquires a restore permission TS# (hereinafter "Y" in FIG. 13) from the RD data and sets the acquired Y as a restore permission TS# in the JNL group management table 58S1 corresponding to the RD-JNL command checked at S1202 (S1213). In addition, the JNL-RD processing unit 61S1 acquires a P site receipt TS# (hereinafter "Z" in FIG. 13) from the RD data and sets the acquired Z as an arrival completion TS# in the JNL group management table 58S1 corresponding to the RD-JNL command checked at S1202 (S1214).

In the meantime, the RM 23, which issues a TS# at regular intervals as described above, is operated based on a definition file shown in FIG. 14.

The definition file 69 includes, for example, the following information:

(14-1) Information on all PDKCs which become issuance destinations of TS# (for example, DKC manufacture serial numbers)

(14-2) Command device number for each PDKC (device number designated at the time of issuing TS#)

(14-3) Information on each PVOL of each PDKC (for example, volume number (LDEV#) of PVOL)

(14-4) TS issuance interval (time interval between issuance of TS# and next issuance of TS#)

Figures 15, 16:
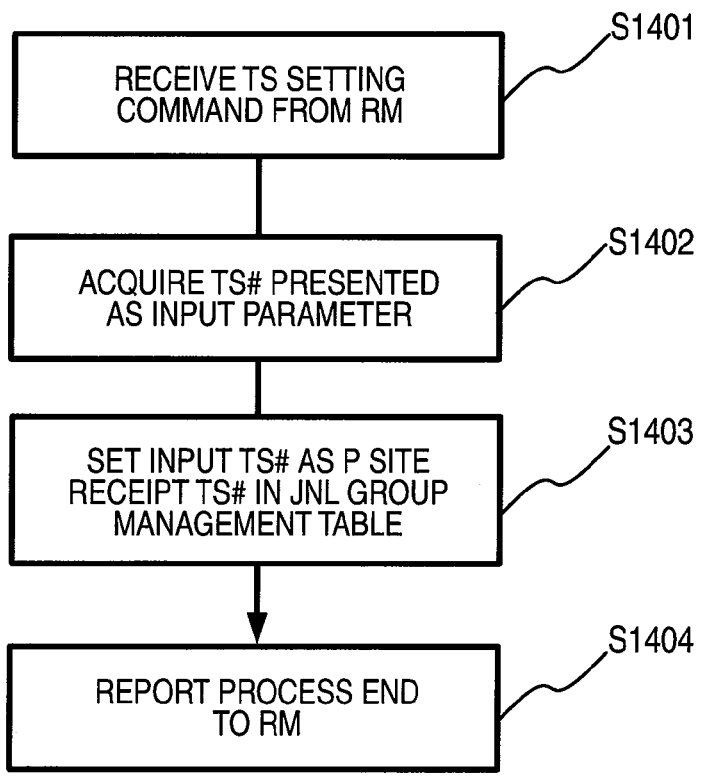
FIG. 15 is a view showing information elements included in a TS setting command.
FIG. 16 is a flow chart showing a process performed by PDKC upon receiving a TS setting command from RM.

On the basis of the definition file 69 shown in FIG. 14, the RM 23 issues a TS setting command to a DKC of Serial#64034 (hereinafter PDKC 11P1) and a DKC of Serial#64045 (hereinafter PDKC 11P2) at a TS issuance interval designated by the file 69. As shown in FIG. 15, the TS setting command includes the following information elements (15-1) and (15-3):

(15-1) Command code (here, code meaning a TS setting command)

(15-2) JNL group number (15-3) TS#

As shown in FIG. 16, if a PDKC receives the TS setting command (S1401), the TS processing unit 51P1 acquires a TS# from the command (S1402), sets the acquired TS# as a P site receipt TS# in the JNL group management table 58P1 corresponding to a JNL group number in the command (S1403), and reports a process end to the RM 23 (S1404).

The RM 23 transmits a restore permission TS# to the PDKCs 11P1 and 11P2 at regular intervals, for example.

Figure 17:
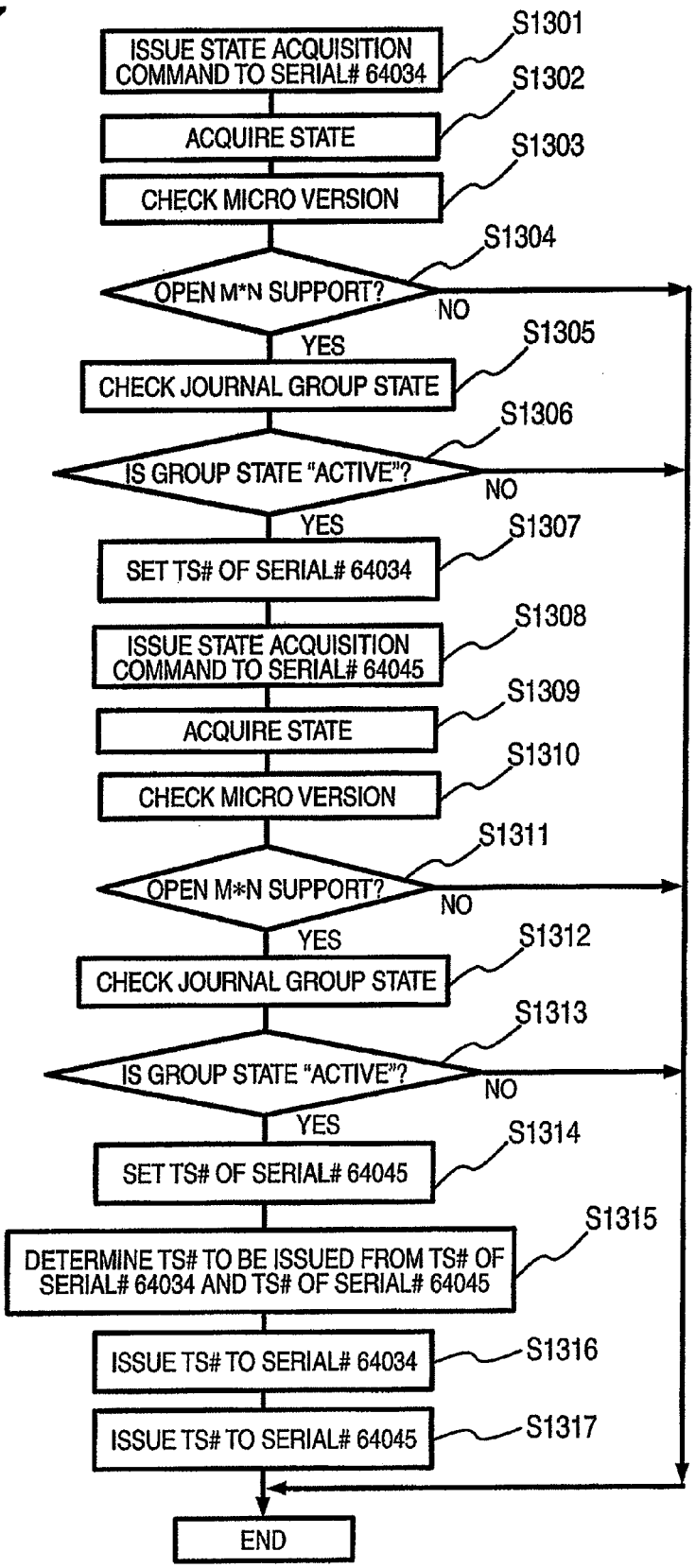
FIG. 17 is a flow chart showing a process to determine restore permission TS#.
Figure 21:
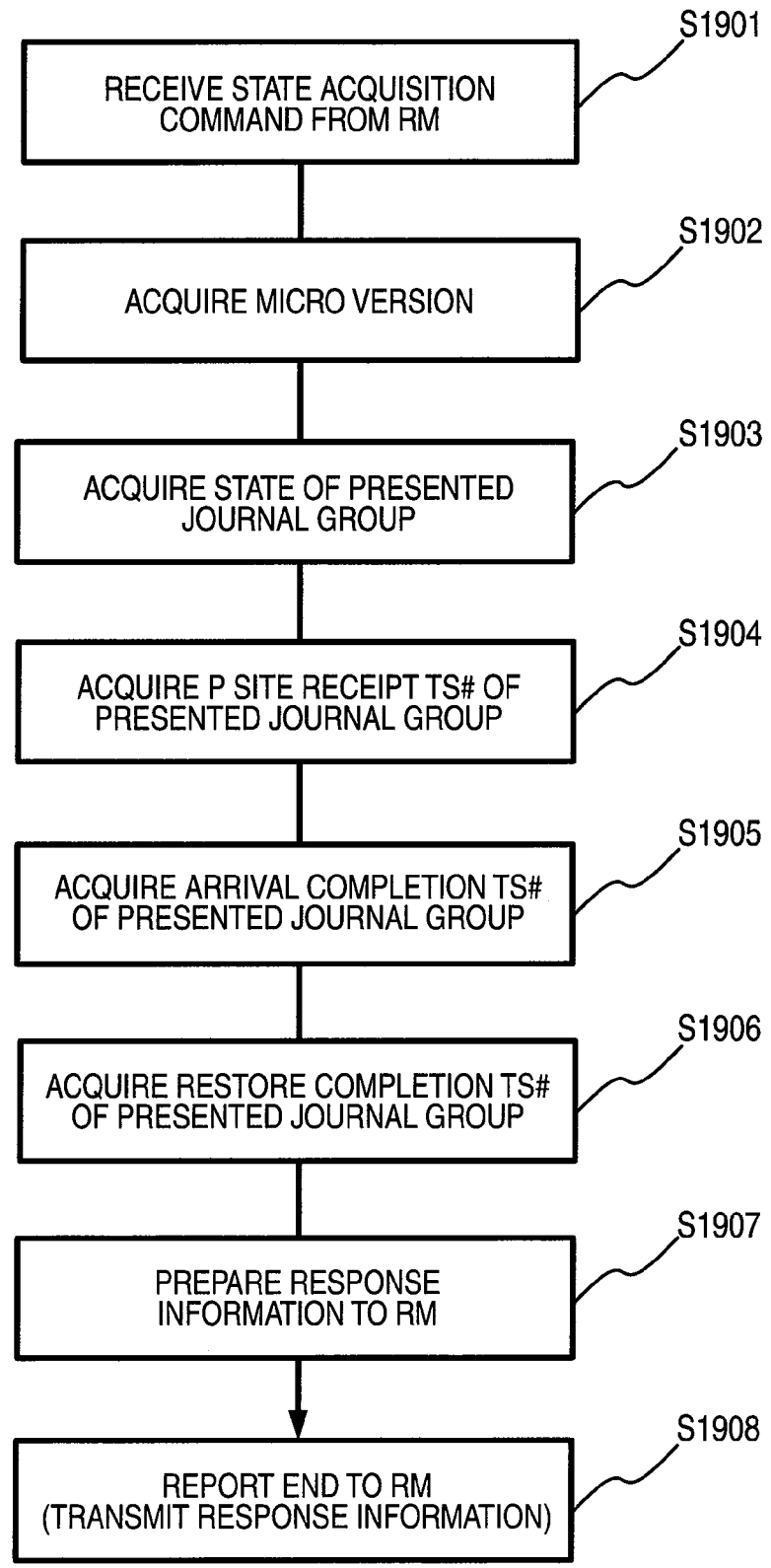
FIG. 21 is a flow chart showing a process performed by PDKC upon receiving a state acquisition command from RM.

Specifically, for example, as shown in FIG. 17, the RM 23 issues a state acquisition command to the DKC of Serial#64034 (PDKC 11P1) (S1301). The state acquisition command includes, for example, a JNL group number. If the PDKC 11P1 (11P2) receives the state acquisition command as shown in FIG. 21 (S1901), for example, the TS processing unit in the 51P1 acquires a micro version as shown in FIG. 21 (S1902). In addition, the TS processing unit 51P1 acquires a JNL group state, a P site receipt TS#, an arrival completion TS# and a restore completion TS# (S1903, S1904, S1905 and S1906) by referring to the JNL group management table 58P1 corresponding to the JNL group number in the state acquisition command, prepares response information (see FIG. 20) including the information acquired at S1902 to S1906 (S1907), and transmits the response information to the RM 23 (S1908).

As shown in FIG. 17, upon receiving the response information on the state acquisition command (S1302), the RM 23 checks the micro version included in the response information (S1303).

If it is specified that when the PDKC 11P1 supports an OPEN M*N according to S1303 (or other methods) (YES in S1304), the RM 23 acquires a JNL group state from the response information received at S1302 (S1305). If the JNL group state is "Active," (YES in S1306) the RM 23 sets the arrival completion TS# included in the response information, as a TS# of the PDKC 11P1 (S1307).

The same processes as the above-described S1301 to S1307 are performed for the PDKC 11P2 (S1308 to S1314).

The RM 23 determines the lowest value of the TS# set at S1307 and the TS# set at S1314 as a restore permission TS# to be issued (S1315). The RM 23 transmits the determined restore permission TS# to the PDKCs 11P1 and 11P2 (S1316 and S1317). The restore permission TS# is transmitted along with the JNL group number included in the state acquisition command issued at S1301 and S1308, for example.

The PDKC 11P1 (11P2) registers the restore permission TS# received from the RM 23 with the JNL group management table 58P1 corresponding to the TS#. In addition, the PDKC 11P1 (11P2) transmits the restore permission TS# registered with the JNL group management table 58P1 to the SDKC 11S1 (11S2). The restore permission TS# may be either actively transmitted by the PDKC 11P1 (11P2) or for example transmitted at the time of transmission of RD data according to the RD-JNL command from the SDKC 11S1 (11S2). The SDKC 11S1 (11S2) registers the restore permission TS# received from the PDKC 11P1 (11P2) with the JNL group management table 58S1 corresponding to the TS#.

Figure 22:
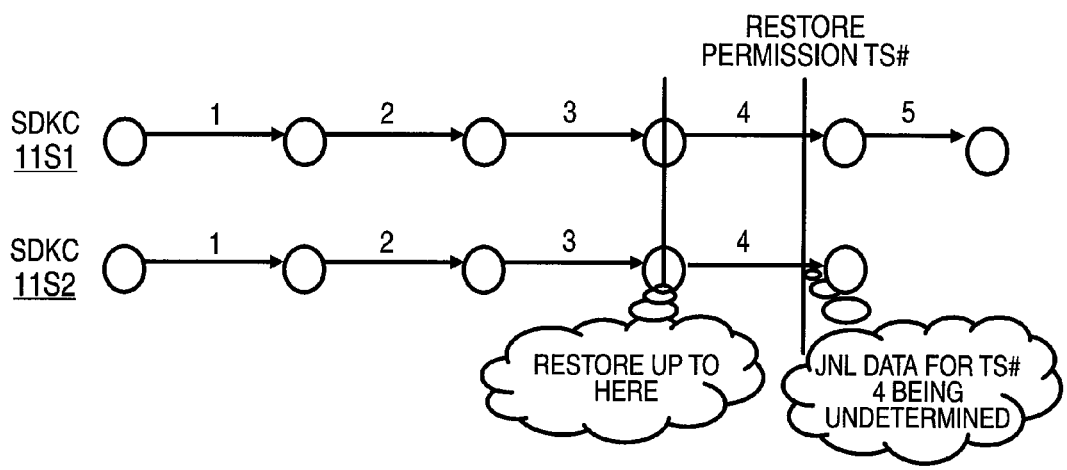
FIG. 22 is an explanatory view of the reason why data up to JNL, which is less by one than restore permission TS#, is reflected.

As described above, in the SDKC 11S1 (11S2), one or more JNLs up to a JNL which has a TS# smaller by one than the restore permission TS# is reflected in SVOL 17S1 (17S2). The reason for this is as shown in FIG. 22. That is, assuming that an arrival completion TS# in the SDKC 11S1 is "5" and an arrival completion TS# in the SDKC 11S2 is "4," although the lowest value of a restore permission TS# becomes "4," the SDKC 11S2 may receive a JNL including a TS#4 in the future. That is, JNL data for the TS#4 are not determined in the SDKC 11S2. Therefore, one or more JNLs up to a JNL including a TS#3 which has a TS# smaller by one than the restore permission TS# is reflected in SDKCs 11S1 and 11S2.

According to the above description, if there is no non-transmitted JNL, upon receiving the RD-JNL command, the PDKC 11P1 (11P2) transmits the NO-JNL including the P site receipt TS#. Thereby, although a specific PDKC which does not receive a WR command for a moment is included in the DKC group 18, the number of non-reflected JNLs excessively increases in a SDKC that has a pair relation with a PDKC other than the specific PDKC. Accordingly, it can be expected to prevent a JVOL from being fully filled with JNLs. A detailed example for this is as shown in FIGS. 23A and 23B.

Figure 23A:
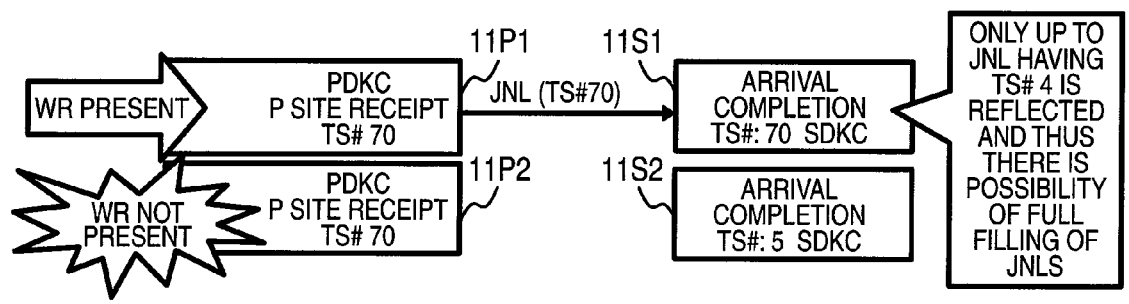
FIG. 23A is an explanatory view of a problem which may occur in the absence of a function to transmit no journal (NO-JNL).

As shown in FIG. 23A, for example, under a situation where the PDKC 11P2 does not receive a WR command for a moment, if the PDKC 11P2 receives an RD-JNL command and thus there is no non-transmitted JNL and if there is no function that exists to transmit a NO-JNL, a P site receipt TS#70 managed by the PDKC 11P2 is not transmitted to the SDKC 11S2 at all. Accordingly, an arrival completion TS#5 managed by the SDKC 11S2 is not updated. As a result, the restore permission TS# also remains at the same value as the arrival completion TS#5 in the SDKC 1152. Accordingly, although up to a JNL having the TS#4 smaller by one than the restore permission TS#5 is reflected in the SDKC 11S1, JNLs subsequent to a JNL having the next TS#5 are left in the JVOL 17SJ1 without being reflected. In addition, every time the PDKC 11P1 receives a WR command, a new JNL is prepared. The new JNL is transmitted to the SDKC 11S1 and written in the JVOL 17SJ1. As a result, the JVOL 17SJ1 is fully filled with JNLs, which may result in impossibility of storage of more new JNLs.

Figure 23B:
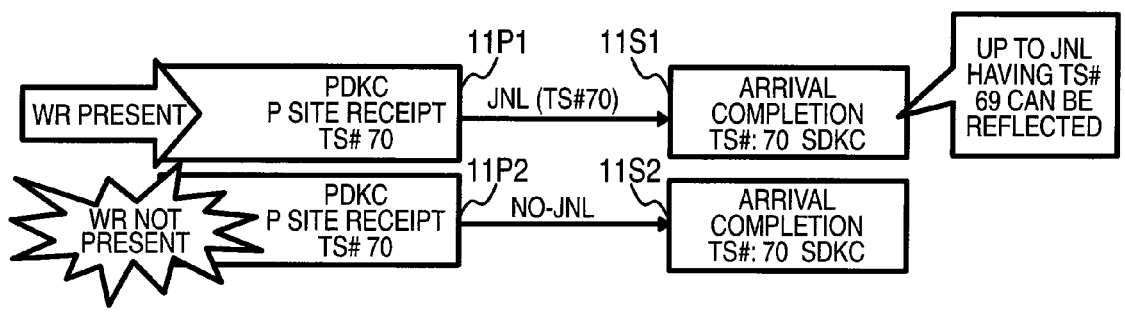
FIG. 23B is an explanatory view of an effect which may be expected in the presence of a function to transmit NO-JNL.

To avoid such impossibility, in this embodiment, as shown in FIG. 23B (that is, as described previously), for example, under a situation where the PDKC 11P2 does not receive the WR command for a moment, if the PDKC 11P2 receives the RD-JNL command and thus there is no non-transmitted JNL, the PDKC 11P2 transmits the RD data, which has no JNL but has the P site receipt TS#, that is, the NO-JNL, to the SDKC 11S2. Thereby, according to the example shown in FIG. 23B, the arrival completion TS#s acquired from the SDKCs 11S1 and 11S2 all become "70" and thus the restore permission TS# also becomes "70", so that the SDKC 11S1 can reflect up to a JNL having a TS#69 in the SVOL 17S1. Accordingly, it can be expected to prevent the JVOL 17SJ1 from being fully filled with non-reflected JNLs.

In addition, according to the above description, the RM 23 transmits a freeze command to the PDKCs 11P1 and 11P2 before transmitting the TS setting command. Thereby, an update order can be maintained.

Figure 24:
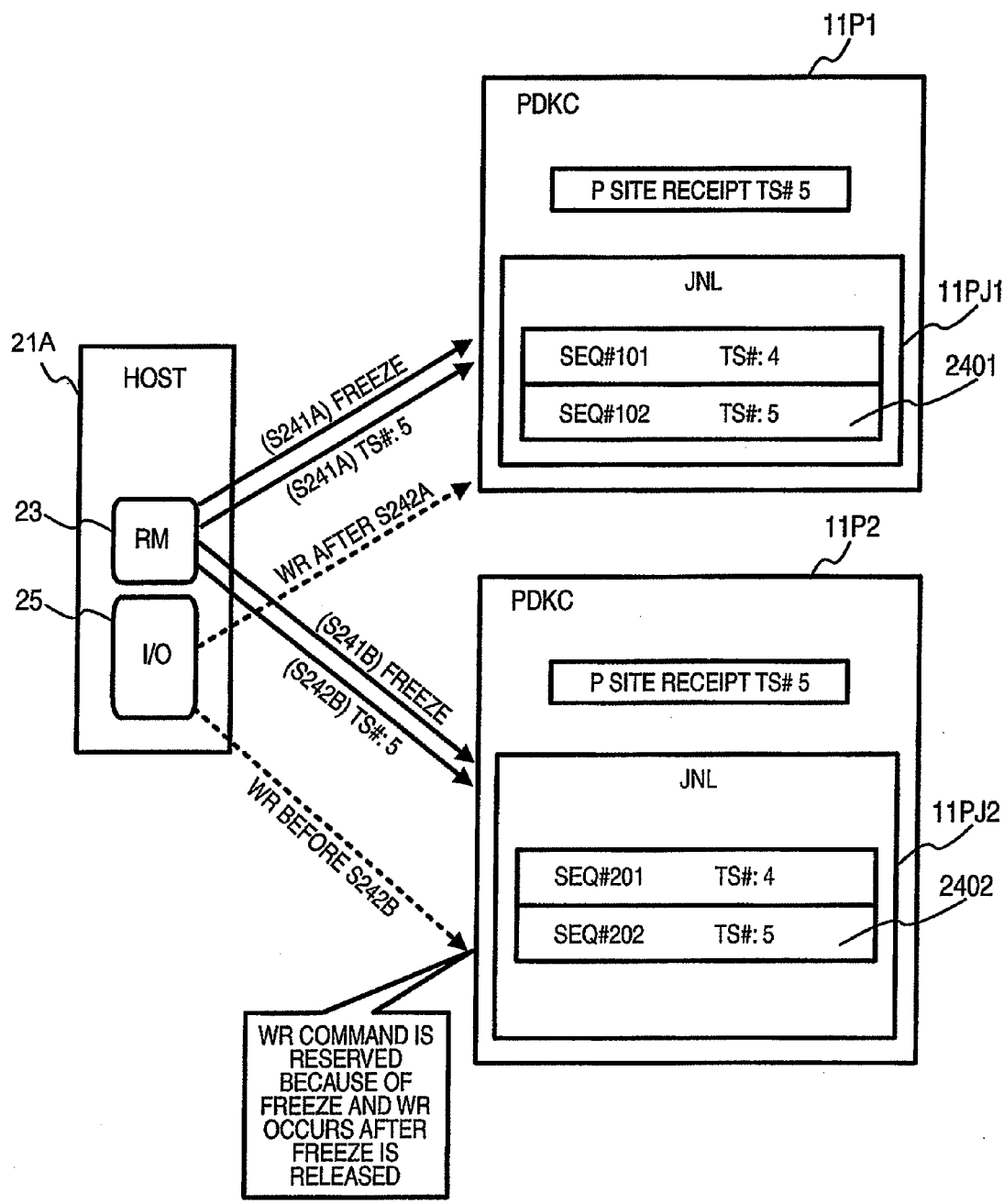
FIG. 24 is an explanatory view of any process in a case where a freeze command is transmitted before a TS setting command is transmitted.

For example, as shown in FIG. 24, the RM 23 transmits the freeze command to the PDKCs 11P1 and 11P2 (S241A and S241B), and then transmits a TS setting command including a TS#5 to the PDKCs 11P1 and 11P2 (S242A and S242B).

The I/O issuing unit 25 starts independent of the RM 23. In other words, a timing at which a TS setting command is issued does not depend on a timing at which a WR command is issued. Thus, as shown in FIG. 24, between when the RM 23 transmits the TS setting command (TS#5) to the PDKC 11P1 and when the RM 23 transmits the TS setting command (TS#5) to the PDKC 11P2 (that is, between S242A and S242B), the I/O issuing unit 25 may transmit one WR command to the PDKC 11P1 while transmitting another WR command to the PDKC 11P2. However, at this point, since the PDKCs 11P1 and 11P2 are all in the freeze state, the PDKCs 11P1 and 11P2 respond to the received WR commands after the freeze state is released. During the freeze state, the TS#5 in the TS setting command issued in S241A and S241B are managed as a P site receipt TS# in the PDKCs 11P1 and 11P2. Accordingly, if the freeze state is released, when a WR process is performed in response to the WR command in S242A, a JNL 2401 including the TS#5 is prepared in the PDKC 11P1, as shown in FIG. 24. Likewise, when a WR process is performed in response to the WR command in S242B, a JNL 2402 including the TS#5 is prepared in the PDKC 11P1.

Figure 25:
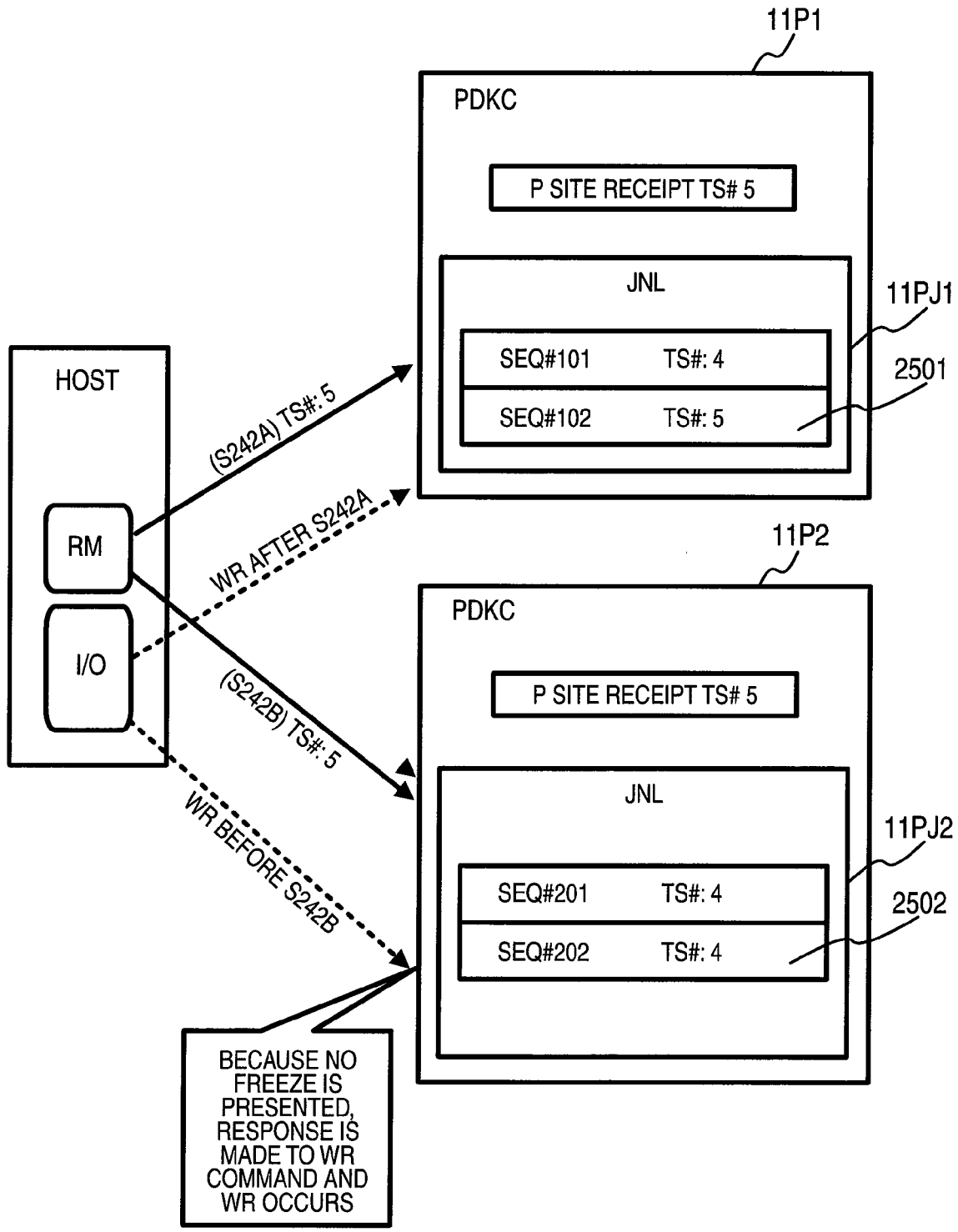
FIG. 25 is an explanatory view of a problem which may occur in a case where a freeze command is not transmitted before a TS setting command is transmitted.

From the above description, if a freeze command is not issued before the TS setting command is received, the following problem may occur. That is, as shown in FIG. 25, when the PDKC 11P1 and 11P2 receive the WR command between the above S242A and S242B, the PDKC 11P1 prepares a JNL 2501 including the TS#5 in the TS setting command received in S242A while the PDKC 11P2 prepares a JNL 2502 including the P site receipt TS#4 before the TS setting command is received in S242B. As a result, for all information that the PDKC 11P1 receives the WR command earlier, the TS# included in the JNL prepared in the PDKC 11P2 becomes a newer value. That is, an update order becomes reversed.

Accordingly, as described above, as the RM 23 transmits the freeze command before transmitting the TS setting command, the update order in the DKC group 18 can be maintained.

Figure 26:
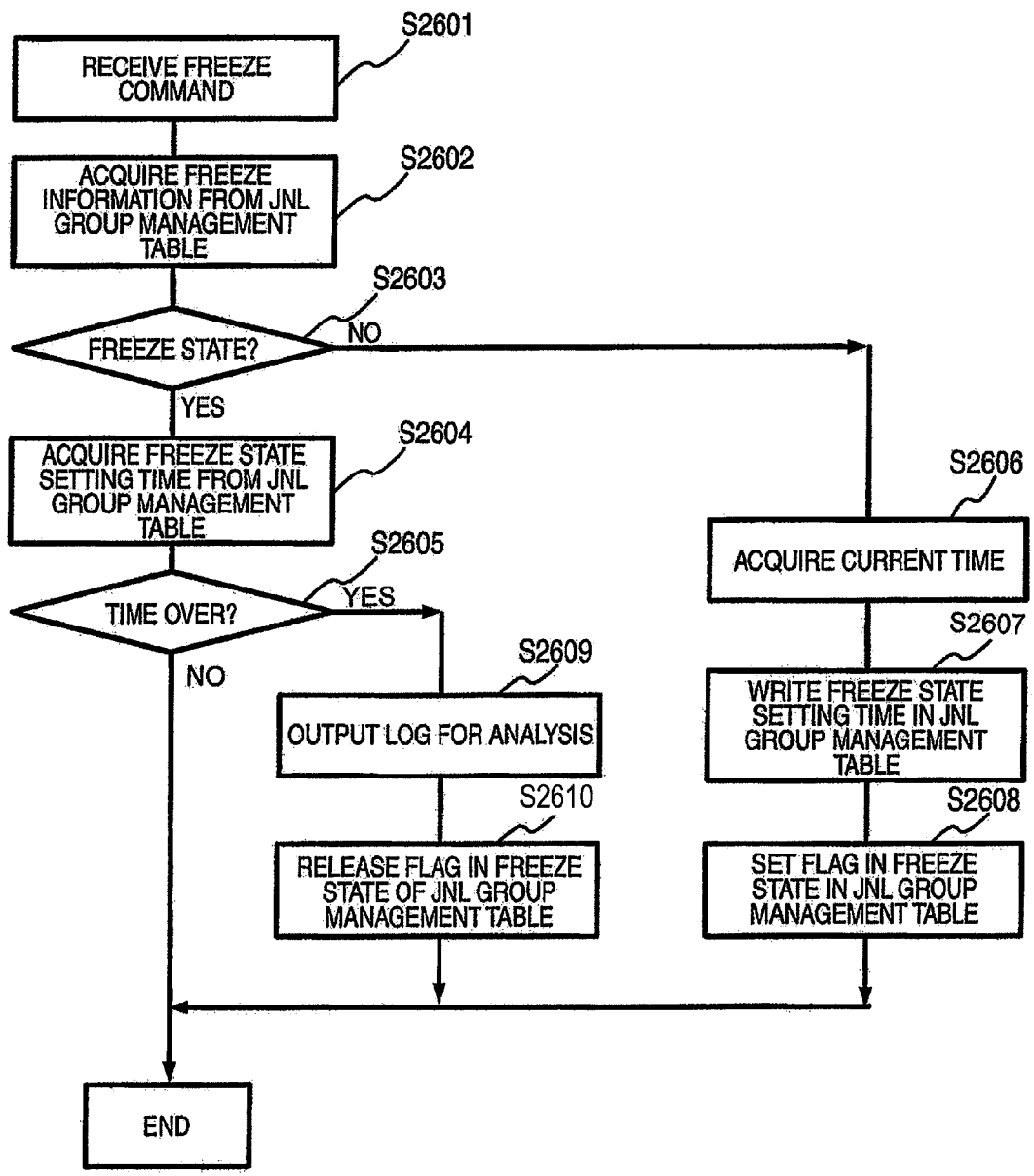
FIG. 26 is a flow chart showing a process performed by PDKC upon receiving a freeze command.

FIG. 26 shows a process performed by a PDKC upon receiving a freeze command.

For example, when the PDKC 11P1 receives a freeze command (S2601), the F/R receipt processing unit 55P1 acquires freeze information from the JNL group management table 58P1 (hereinafter referred to as "object JNL group management table" in the description of FIG. 26) corresponding to a JNL group number designated by the freeze command (S2602).

If the freeze information acquired at S2602 does not indicate a freeze state (NO in S2603), the F/R receipt processing unit 55P1 acquires current time from, for example, a timer (S2606) and writes the acquired current time as freeze state setting time in the object JNL group management table (S2607). In addition, the F/R receipt processing unit 55P1 sets the freeze information (sets flag in freeze state) indicating present status of freezing in the object JNL group management table (S2608).

On the other hand, if the freeze information acquired at S2602 indicates the freeze state (YES in S2603), the F/R receipt processing unit 55P1 acquires freeze state setting time from the object JNL group management table (S2604). If a difference between time indicated by the freeze state setting time acquired at S2604 and the current time does not exceed predetermined time (that is, time overdoes not occur) (NO in S2605), the present process is ended. On the other hand, if time over occurs (YES in S2605), the F/R receipt processing unit 55P1 outputs a log for analysis (S2609) and updates the freeze information registered with the object JNL group management table to information indicating no freeze state (releases flag in freeze state)(S2610).

Although it is shown in FIG. 26 that the freeze state is released if time over occurs, instead of or in addition to this, the freeze state may be released by a command from the RM 23. Hereinafter, the release command for the freeze state is referred to as "RUN command."

Figure 27:
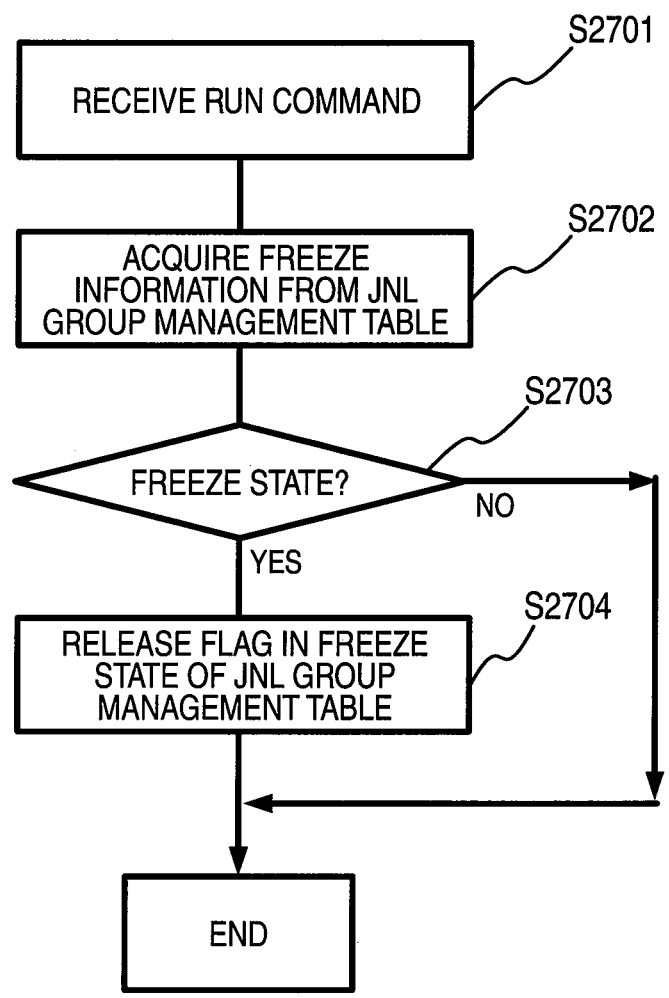
FIG. 27 is a flow chart showing a process performed by PDKC upon receiving a RUN command.

FIG. 27 shows a process performed by a PDKC upon receiving a RUN command.

For example, when the PDKC 11P1 receives a RUN command, the F/R receipt processing unit 55P1 acquires freeze information from the JNL group management table 58P1 corresponding to a JNL group number designated by the RUN command (hereinafter referred to as "object JNL group management table" in the description of FIG. 27) (S2702).

If the freeze information acquired at S2702 indicates a freeze state (YES in S2703), the F/R receipt processing unit 55P1 updates the freeze information registered with the object JNL group management table to information indicating no freeze state (releases flag in freeze state)(S2704). If the freeze information acquired at S2702 does not indicate a freeze state (NO in S2703), then processing proceeds to the end.

Figure 28:
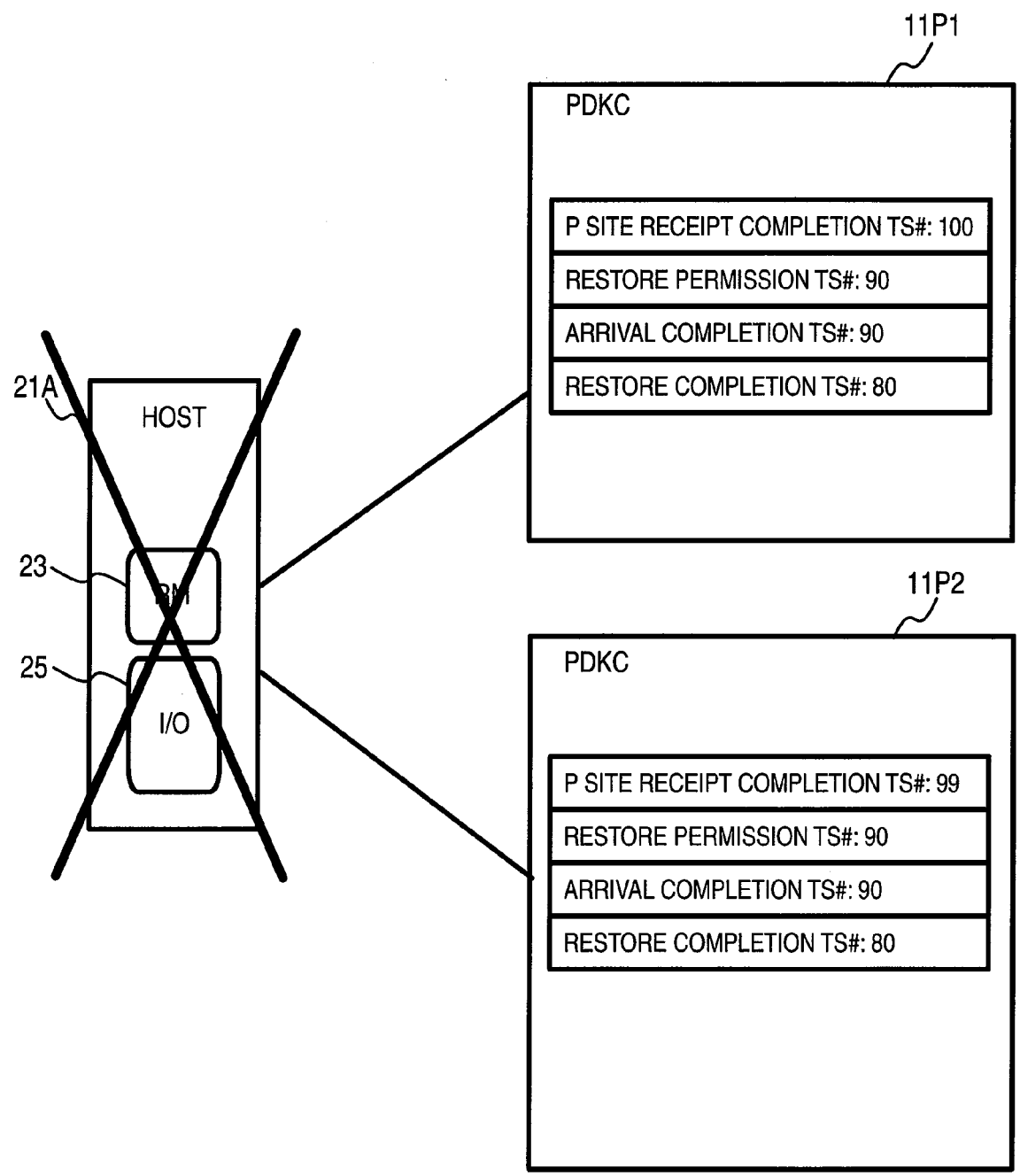
FIG. 28 is a view showing occurrence of disturbance in RM.
Figure 29:
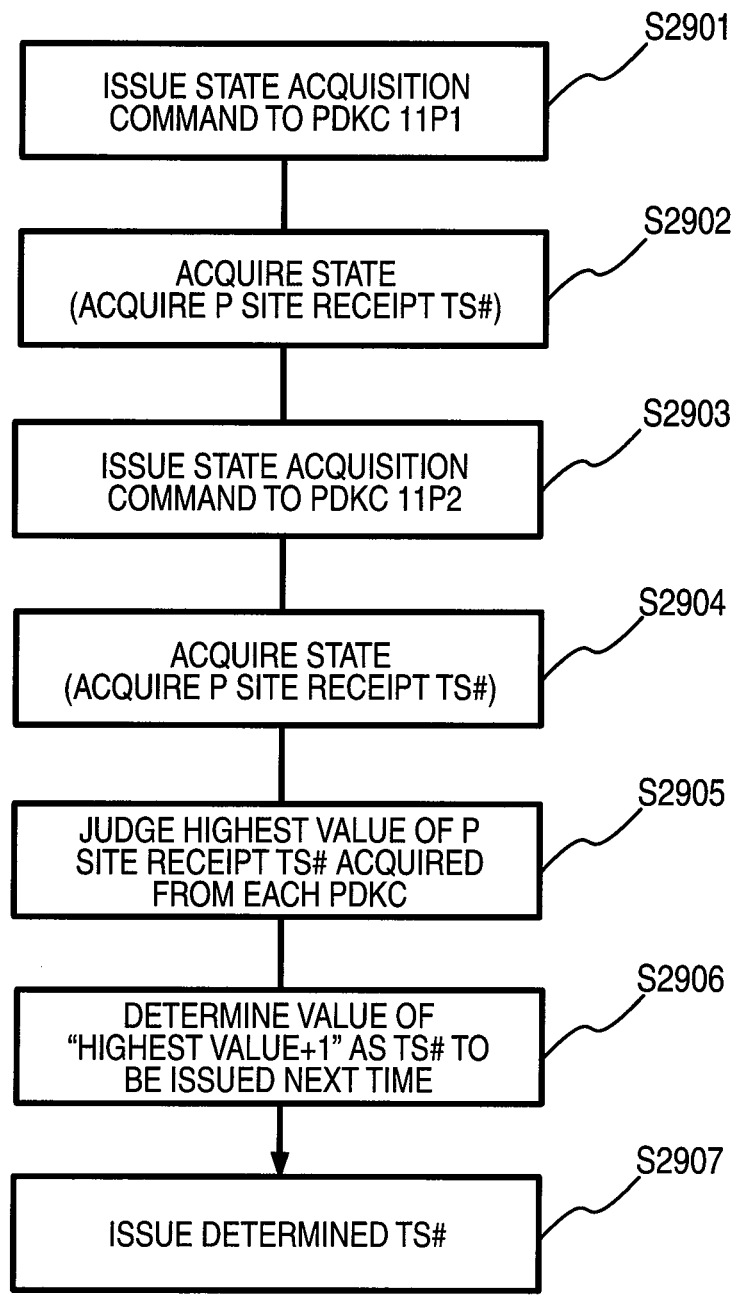
FIG. 29 is a flow chart showing a process performed when RM is restored out of a disturbance.

In the meantime, in this embodiment, if a disturbance occurs in the RM 23, as shown in FIG. 28, and thereafter if the RM 23 is restored out of the disturbance, the RM 23 determines what TS# is to be set in a TS setting command to be first transmitted after the restoration. In more detail, a process shown in FIG. 29 is performed.

When the RM 23 transmits a state acquisition command for any JNL group (hereinafter referred to as "object group" in the description of FIG. 29) to the PDKC 11P1 (S2901), the RM 23 receives a P site receipt TS# corresponding to the object JNL group (TS#100 in the example of FIG. 28), which is currently stored in the PDKC 11P1, from the PDKC 11P1 (S2902). Likewise, when the RM 23 transmits a state acquisition command for the object JNL group to the PDKC 11P2 (S2903), the RM 23 receives a P site receipt TS# corresponding to the object JNL group (TS#99 in the example of FIG. 28), which is currently stored in the PDKC 11P2, from the PDKC 11P1 (S2904). The RM 23 judges the highest value of the P site receipt TS#s received at S2902 and S2904 (S2905) and determines a value (i.e., "101") larger by one than the judged highest value ("100" in the example of FIG. 28) as a TS# to be issued (S2906). The RM 23 transmits a TS setting command including the determined TS# to the PDKCs 11P1 and 11P2 (S2907).

Figure 30:
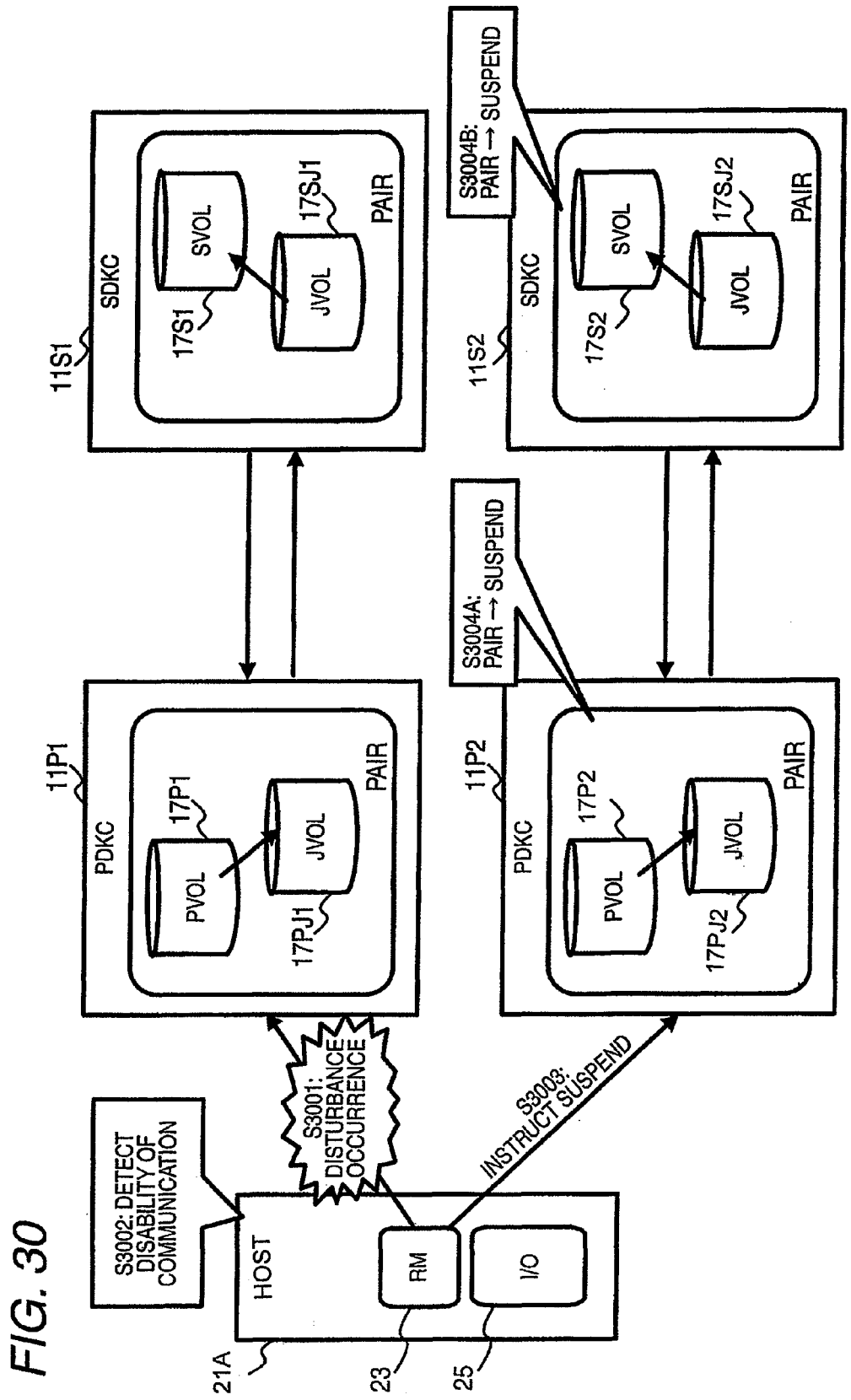
FIG. 30 is a view showing a process performed when there occurs a disturbance between RM and PDKC 11P1.
Figure 31:
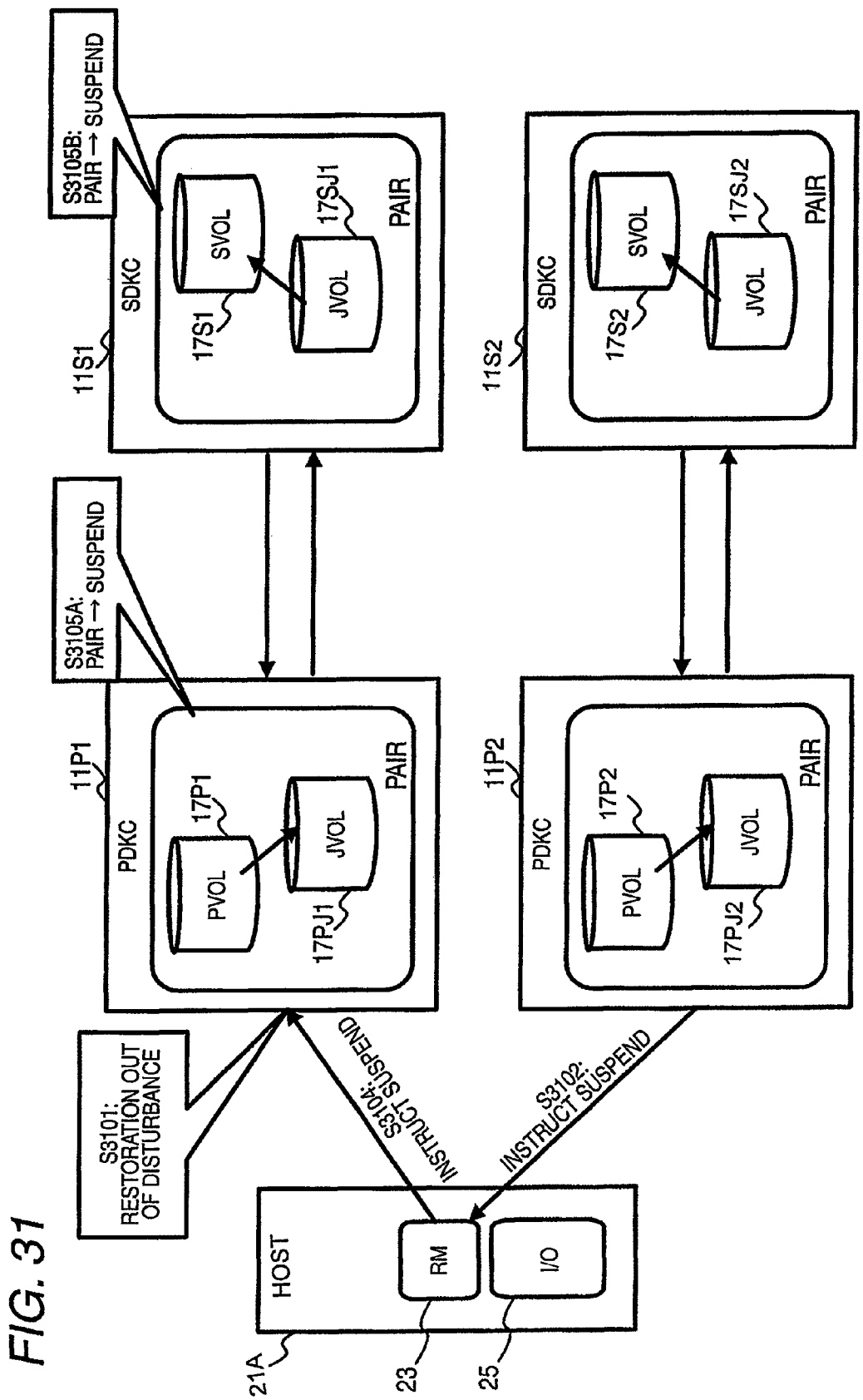
FIG. 31 is a view showing a process performed when the disturbance shown in FIG. 30 is removed.
Figure 32:
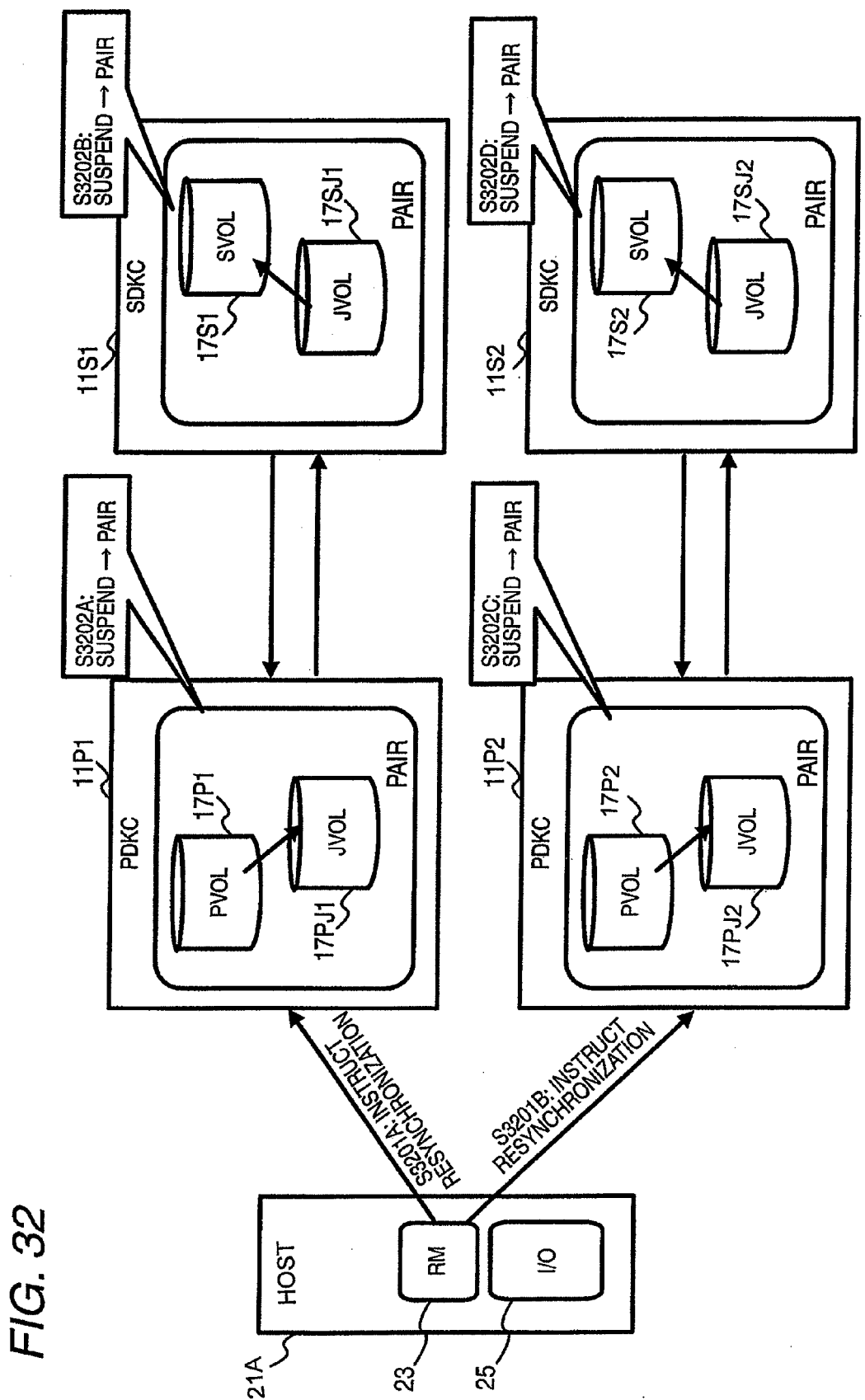
FIG. 32 is a continuation of the process shown in FIG. 31.

In the meantime, in this embodiment, if there occurs a disturbance between the host 21A and one PDKC (for example, the PDKC 11P1) (S3001), as shown in FIG. 30, a process shown in FIGS. 30 to 32 is performed. In the following description, on the basis of FIG. 5, pair state modifying units of the PDKC 11P2 and the SDKC 11S2 are referred to as pair state modifying units 56P2 and 56S2, respectively, and pair management tables of the PDKC 11P2 and the SDKC 11S2 are referred to as pair management tables 57P2 and 57S2, respectively.

For example, if the RM 23 receives no response from the PDKC 11P1 although the RM 23 issues a state setting command to the PDKC 11P1, the RM 23 detects disability of communication with the PDKC 11P1 (S3002). Then, the RM 23 instructs a communicable PDKC 11P2 to be suspended (S3003). In response to this instruction, the pair state modifying unit 56P2 in the PDKC 11P2 updates a pair state of all pairs to "Suspend" by referring to the pair management table 57P2 (S3004A). When it is detected that the pair state of all pairs in the PDKC 11P2 is updated to "Suspend," the pair state modifying unit 56S2 in the SDKC 11S2 updates all pair states in the pair management table 57S2 to "Suspend" (S3004B). The update of the pair state of all pairs in the PDKC 11P2 to "Suspend" may be either actively reported from the PDKC 11P2 to the SDKC 11S2 or reported with a response to an inquiry from the SDKC 11S2.

Thereafter, if the RM 23 is restored out of the disturbance occurring in S3001 (S3101), as shown in FIG. 31, the RM 23 makes a state between the PDKC 11P1 related to the restoration out of the disturbance and the SDKC 11S1 equal to a state between the PDKC 11P2 and the SDKC 11S2. That is, the RM 23 detects from the PDKC 11P2 that all pair states in the PDKC 11P2 are set to "Suspend" (S3102). In this case, the RM 23 instructs the PDKC 11P1 to be suspended (S3104). In response to this instruction, the pair state modifying unit 56P1 in the PDKC 11P1 updates a pair state of all pairs to "Suspend" by referring to the pair management table 57P1 (S3105A). When it is detected that the pair state of all pairs in the PDKC 11P1 is updated to "Suspend," the pair state modifying unit 56S1 in the SDKC 11S1 updates all pair states in the pair management table 57S1 to "Suspend" (S3105B).

Thereafter, the RM 23 instructs the PDKC 11P1 to be resynchronized (S3201A) as shown in FIG. 32. In response to this instruction, the pair state modifying unit 56P1 in the PDKC 11P1 updates a pair state of all pairs from "Suspend" to "PAIR" by referring to the pair management table 57P1 (S3202A). When it is detected that the pair state of all pairs in the PDKC 11P1 is updated to "PAIR," the pair state modifying unit 56S1 in the SDKC 11S1 updates all pair states in the pair management table 57S1 from "Suspend" to "PAIR" (S3202B). Also, the pair state transits from "Suspend," through "Copy," to "PAIR." During the pair state "Copy," a difference between a PVOL and a SVOL is reflected in the SVOL, thereby making the contents of the PVOL equal to the contents of the SVOL and thus setting the pair state to be "PAIR."

The above-described processes are performed in the same way for the PDKC 11P2 and the SDKC 11S2 (S3201B, S3202C and S3202D).

Although the present invention has been shown and described by way of the exemplary embodiments, the present invention is not limited to the exemplary embodiments but it is to be understood that the present invention may be modified and changed in various ways without departing from the spirit and scope of the invention. For example, the present invention can be applied to computer systems having mainframe computers without being limited to computer systems having open systems.

What is claimed is:

1. A computer system comprising:
one or more primary storage systems;
one or more secondary storage systems coupled to the one or more primary storage systems; and
a plurality of computers coupled to the one or more primary storage systems,
wherein one of the computers includes a storage managing unit and at least another one of the computers includes an Input/output (I/O) issuing unit,
wherein the storage managing unit is configured to increment a time stamp number (TS#) and issue the incremented TS# to each of the one or more primary storage systems at intervals,
wherein each of the one or more primary storage systems is configured to receive the incremented TS# issued from the storage managing unit at intervals,
wherein the one or more primary storage systems include primary volumes and primary journal memory regions,
wherein the one or more secondary storage systems include secondary volumes and secondary journal memory regions,
wherein the primary volumes are respectively paired with the secondary volumes,
wherein the I/O issuing unit is configured to issue a write command designating a primary volume among the primary volumes in the one or more primary storage systems,
wherein each of the one or more primary storage systems is configured to:
receive the write command designating its corresponding own primary volume among the primary volumes,
write data according to the received write command in the own primary volume,
prepare a journal including journal data, which is a replica of the data, and the TS# most recently received from the storage managing unit,
store the prepared journal in its corresponding own primary journal memory region, and
transmit the journal to a secondary storage system among the one or more secondary storage systems, which includes a secondary volume, among the secondary volumes, being paired with the own primary volume,
wherein each of the one or more secondary storage systems is configured to:
receive a journal,
write the received journal in its corresponding own secondary journal memory region among the secondary journal memory regions, and
write journal data, in its corresponding own secondary volume among the secondary volumes, included in journals a particular journal through an oldest non-written journal among non-written journals stored in the own secondary journal memory region,
wherein each of the non-written journals is a journal of which journal data have not yet been written in a secondary volume among the secondary volumes,
wherein the oldest non-written journal stored in the own secondary journal memory region is a non-written journal including the smallest TS# among TS#s included in the non-written journals stored in the own secondary journal memory region,
wherein the particular journal stored in the own secondary journal memory region is a journal including an TS#, among TS#s included in the non-written journals stored in the own secondary journal memory region, which is an small TS# next to the smallest arrival completion TS# among arrival completion TS#s in the one or more secondary storage systems, and
wherein, for each of the one or more secondary storage systems, an arrival completion TS# is the largest TS# among TS#s which are included in journals which have already been received.

2. A computer system according to claim 1,
wherein the one or more secondary storage systems are configured to transmit journal read commands to the one or more primary storage systems,
wherein the one or more primary storage systems are configured to transmit, upon receiving the journal read command, non-transmitted journals of one or more journals stored in the primary journal memory regions to the one or more secondary storage systems, and, if there exists no non-transmitted journal, transmit information units, which include the TS#s most recently received from the storage managing unit, to the one or more secondary storage systems.

3. A computer system according to claim 1,
wherein the storage managing unit is configured to transmit TS# inquiries to the one or more primary storage systems,
wherein the one or more primary storage systems are configured to receive the TS# inquiries, and notify the storage managing unit of the arrival completion TS#s in response to the TS# inquiries,
wherein the storage managing unit is configured to transmit, before transmitting the TS# inquiries, freeze commands, which are respectively commands reserving I/O, to the one or more primary storage systems,
wherein the storage managing unit is configured to transmit the TS# inquiries after transmitting the freeze commands,
wherein each of the one or more primary storage systems is configured to receive a freeze command among the freeze commands, enter, upon receiving the freeze command, into a freeze state in which a write process to write data according to a write command from the I/O issuing unit in its corresponding own primary volume, among the primary volumes, designated by the write command is not performed, and perform the write process after the freeze state is released.

4. A computer system according to claim 1,
wherein the one or more primary storage systems comprises two or more primary storage systems, and
wherein, the storage managing unit is configured to transmit, upon detecting that at least one of the two or more primary storage systems has been restored out of a disturbance, TS# inquiries to the two or more primary storage systems, receive the arrival completion TS#s from the two or more primary storage systems, and set the largest TS# among the arrival completion TS#s, as an TS# to be first transmitted after being restored out of the disturbance.

5. A computer system according to claim 1,
wherein the one or more secondary storage systems are configured to notify the one or more primary storage systems of the arrival completion TS#s,
wherein the storage managing unit is configured to transmit an TS# inquiries to the one or more primary storage systems, receive arrival completion TS#s from the one or more primary storage systems in response to the TS# inquiries, and notify the one or more primary storage systems of the smallest arrival completion TS# among the arrival completion TS#s or an small TS# next to the smallest arrival completion TS#, as a restore permission TS#, and
wherein the particular journal stored in the own secondary journal memory region is a journal including an TS#, among TS#s included in the non-written journals stored in the own secondary journal memory region, which is the restore permission TS# or a small TS# next to the restore permission TS#.

6. A computer system according to claim 5,
wherein the one or more secondary storage systems are configured to transmit journal read commands including the arrival completion TS#s to the one or more primary storage systems,
wherein the one or more primary storage systems are configured to transmit, upon receiving the journal read commands, non-transmitted journals of one or more journals stored in the primary journal memory regions to the one or more secondary storage systems,
wherein the one or more primary storage systems are configure to transmit the arrival completion TS#s included in the journal read commands to the storage managing unit.

\* \* \* \* \*